US011190589B1

(12) United States Patent
Ron et al.

(10) Patent No.: US 11,190,589 B1
(45) Date of Patent: Nov. 30, 2021

(54) SYSTEM AND METHOD FOR EFFICIENT FINGERPRINTING IN CLOUD MULTITENANT DATA LOSS PREVENTION

(71) Applicant: Forcepoint, LLC, Austin, TX (US)

(72) Inventors: Ayval Ron, Ra'anana (IL); Fodi Medhat, Ra'anana (IL); Yan Lerman, Ra'anana (IL)

(73) Assignee: Forcepoint, LLC, Austin, TX (US)

( * ) Notice: Subject to any disclaimer, the term of this patent is extended or adjusted under 35 U.S.C. 154(b) by 0 days.

(21) Appl. No.: 17/081,663

(22) Filed: Oct. 27, 2020

(51) Int. Cl.
*G06F 15/173* (2006.01)
*H04L 29/08* (2006.01)
*H04L 29/06* (2006.01)

(52) U.S. Cl.
CPC ...... *H04L 67/1097* (2013.01); *H04L 63/0428* (2013.01); *H04L 63/105* (2013.01); *H04L 63/20* (2013.01)

(58) Field of Classification Search
USPC ........................................................ 709/224
See application file for complete search history.

(56) References Cited

U.S. PATENT DOCUMENTS

| | | | |
|---|---|---|---|
| 6,072,875 | A | 6/2000 | Tsudik |
| 6,678,693 | B1 | 1/2004 | Shiraishi |
| 7,107,447 | B2 | 9/2006 | Sanin et al. |
| 7,694,150 | B1 | 4/2010 | Kirby |
| 7,725,565 | B2 | 5/2010 | Li et al. |
| 7,813,944 | B1 | 10/2010 | Luk et al. |
| 7,933,960 | B2 | 4/2011 | Chen et al. |
| 8,181,253 | B1 | 5/2012 | Zaitsev et al. |
| 8,312,064 | B1 | 11/2012 | Gauvin |

(Continued)

FOREIGN PATENT DOCUMENTS

WO  WO-2019153581 A1  8/2019

OTHER PUBLICATIONS

Sanjeev Goyal et al., Attack, Defence and Contagion in Networks, The Review of Economic Studies, vol. 81, Issue 4, Oct. 2014, pp. 1518-1542, https://doi.org/10.1093/restud/rdu013 (2014).

(Continued)

*Primary Examiner* — Anthony Mejia
(74) *Attorney, Agent, or Firm* — Terrile, Cannatti & Chambers; Jonathan N. Geld

(57) ABSTRACT

A data loss prevention mechanism for a cloud-based security analytics system is provided that utilizes a compact repository that improves the ratio of false positives over traditional methods, maintains a small data size, permits distribution of compact repository files to a large number of analyzing nodes, and provides metadata for matched events. A compressed bitmap of information found in a compact repository is used, thereby improving the utilization of storage space for a repository containing information associated with a significant number of data fingerprints. Compression further allows for a larger entry size in the compact repository, thereby providing a lower false positive rate. A mechanism for distributing updates to compact repositories residing on cloud servers is provided by updating a central server and propagating the updates to remote servers. Identification of secured data associated with unstructured data fingerprints is also handled using distributed reference to a centralized fingerprint repository.

18 Claims, 9 Drawing Sheets

(56) References Cited

U.S. PATENT DOCUMENTS

| | | |
|---|---|---|
| 8,424,061 B2 | 4/2013 | Rosenoer |
| 8,484,066 B2 | 7/2013 | Miller et al. |
| 8,490,163 B1 | 7/2013 | Harsell et al. |
| 8,713,633 B2 | 4/2014 | Thomas |
| 8,776,168 B1 | 7/2014 | Gibson et al. |
| 8,826,443 B1 | 9/2014 | Raman et al. |
| 8,892,690 B2 | 11/2014 | Liu et al. |
| 8,990,930 B2 | 3/2015 | Burrell et al. |
| 9,015,812 B2 | 4/2015 | Plattner et al. |
| 9,015,847 B1 | 4/2015 | Kaplan et al. |
| 9,043,905 B1 | 5/2015 | Allen et al. |
| 9,053,124 B1* | 6/2015 | Dornquast .......... G06F 11/1453 |
| 9,128,995 B1 | 9/2015 | Fletcher et al. |
| 9,137,318 B2 | 9/2015 | Hong |
| 9,166,999 B1 | 10/2015 | Kulkarni et al. |
| 9,223,972 B1 | 12/2015 | Vincent et al. |
| 9,246,941 B1 | 1/2016 | Gibson et al. |
| 9,262,722 B1 | 2/2016 | Daniel |
| 9,298,726 B1* | 3/2016 | Mondal ................ G06F 3/0608 |
| 9,342,553 B1 | 5/2016 | Fuller |
| 9,369,433 B1* | 6/2016 | Paul ..................... G06F 21/572 |
| 9,485,266 B2 | 11/2016 | Baxley et al. |
| 9,542,650 B2 | 1/2017 | Lospinoso et al. |
| 9,596,146 B2 | 3/2017 | Coates et al. |
| 9,609,010 B2 | 3/2017 | Sipple |
| 9,665,854 B1 | 5/2017 | Burger et al. |
| 9,692,762 B2 | 6/2017 | Barkan et al. |
| 9,755,913 B2 | 9/2017 | Bhide et al. |
| 9,762,582 B1 | 9/2017 | Hockings et al. |
| 9,798,883 B1 | 10/2017 | Gil et al. |
| 9,935,891 B1 | 4/2018 | Stamos |
| 9,977,824 B2 | 5/2018 | Agarwal et al. |
| 10,096,065 B2 | 10/2018 | Little |
| 10,108,544 B1* | 10/2018 | Duggal ................ G06F 3/0641 |
| 10,187,369 B2 | 1/2019 | Caldera et al. |
| 10,235,285 B1* | 3/2019 | Wallace ............... G06F 3/0608 |
| 10,237,298 B1 | 3/2019 | Nguyen et al. |
| 10,270,794 B1 | 4/2019 | Mukerji et al. |
| 10,275,671 B1 | 4/2019 | Newman |
| 10,282,702 B2 | 5/2019 | Paltenghe et al. |
| 10,284,601 B1 | 5/2019 | Bar-Menachem et al. |
| 10,320,813 B1 | 6/2019 | Ahmed et al. |
| 10,341,391 B1 | 7/2019 | Pandey et al. |
| 10,417,454 B1 | 9/2019 | Marom et al. |
| 10,417,653 B2 | 9/2019 | Milton et al. |
| 10,419,428 B2 | 9/2019 | Tunnell et al. |
| 10,432,669 B1 | 10/2019 | Badhwar et al. |
| 10,545,738 B1 | 1/2020 | Jaeger et al. |
| 10,579,281 B2 | 3/2020 | Cherubini et al. |
| 10,713,934 B2 | 7/2020 | Sayavong et al. |
| 10,917,319 B2 | 2/2021 | Scheib et al. |
| 2002/0112015 A1 | 8/2002 | Haynes |
| 2002/0123865 A1 | 9/2002 | Whitney et al. |
| 2004/0034582 A1 | 2/2004 | Gilliam et al. |
| 2004/0044613 A1 | 3/2004 | Murakami et al. |
| 2005/0120025 A1 | 6/2005 | Rodriguez et al. |
| 2005/0198099 A1 | 9/2005 | Motsinger et al. |
| 2005/0273850 A1 | 12/2005 | Freund |
| 2006/0048209 A1 | 3/2006 | Shelest et al. |
| 2006/0053476 A1 | 3/2006 | Bezilla et al. |
| 2006/0112111 A1 | 5/2006 | Tseng et al. |
| 2006/0117172 A1 | 6/2006 | Zhang et al. |
| 2006/0129382 A1 | 6/2006 | Anand et al. |
| 2006/0195905 A1 | 8/2006 | Fudge |
| 2006/0206449 A1 | 9/2006 | Fletcher et al. |
| 2006/0225124 A1 | 10/2006 | Kolawa et al. |
| 2007/0043703 A1 | 2/2007 | Bhattacharya et al. |
| 2007/0121522 A1 | 5/2007 | Carter |
| 2007/0225995 A1 | 9/2007 | Moore |
| 2007/0234409 A1 | 10/2007 | Eisen |
| 2008/0168002 A1 | 7/2008 | Kagarlis et al. |
| 2008/0168135 A1 | 7/2008 | Redlich et al. |
| 2008/0168453 A1 | 7/2008 | Hutson et al. |
| 2008/0198453 A1 | 8/2008 | LaFontaine et al. |
| 2008/0244741 A1 | 10/2008 | Gustafson et al. |
| 2009/0006888 A1 | 1/2009 | Bernhard et al. |
| 2009/0182872 A1 | 7/2009 | Hong |
| 2009/0228474 A1 | 9/2009 | Chiu et al. |
| 2009/0300712 A1 | 12/2009 | Kaufmann et al. |
| 2010/0024014 A1* | 1/2010 | Kailash ................ H04L 9/3213 726/6 |
| 2010/0057662 A1 | 3/2010 | Collier et al. |
| 2010/0058016 A1 | 3/2010 | Nikara et al. |
| 2010/0094767 A1 | 4/2010 | Miltonberger |
| 2010/0094818 A1 | 4/2010 | Farrell et al. |
| 2010/0107255 A1 | 4/2010 | Eiland et al. |
| 2010/0146622 A1 | 6/2010 | Nordstrom et al. |
| 2010/0205224 A1 | 8/2010 | Palanisamy et al. |
| 2010/0235495 A1* | 9/2010 | Petersen ............ H04L 63/1458 709/224 |
| 2010/0275263 A1 | 10/2010 | Bennett et al. |
| 2011/0061093 A1 | 3/2011 | Korkus et al. |
| 2011/0167105 A1 | 7/2011 | Ramakrishnan et al. |
| 2011/0307957 A1 | 12/2011 | Barcelo et al. |
| 2012/0046989 A1 | 2/2012 | Baikalov et al. |
| 2012/0047575 A1 | 2/2012 | Baikalov et al. |
| 2012/0079107 A1 | 3/2012 | Williams et al. |
| 2012/0110087 A1 | 5/2012 | Culver et al. |
| 2012/0137367 A1 | 5/2012 | Dupont et al. |
| 2012/0210158 A1 | 8/2012 | Akiyama et al. |
| 2012/0259807 A1 | 10/2012 | Dymetman |
| 2013/0013550 A1 | 1/2013 | Kerby |
| 2013/0054433 A1 | 2/2013 | Giard et al. |
| 2013/0055367 A1 | 2/2013 | Kshirsagar et al. |
| 2013/0081141 A1 | 3/2013 | Anurag |
| 2013/0097662 A1 | 4/2013 | Pearcy et al. |
| 2013/0102283 A1 | 4/2013 | Lau et al. |
| 2013/0104236 A1 | 4/2013 | Ray et al. |
| 2013/0132551 A1 | 5/2013 | Bose et al. |
| 2013/0174259 A1 | 7/2013 | Pearcy et al. |
| 2013/0205366 A1 | 8/2013 | Luna et al. |
| 2013/0238422 A1 | 9/2013 | Saldanha |
| 2013/0297729 A1 | 11/2013 | Suni et al. |
| 2013/0305358 A1 | 11/2013 | Gathala et al. |
| 2013/0317808 A1 | 11/2013 | Kruel et al. |
| 2013/0320212 A1 | 12/2013 | Valentino et al. |
| 2013/0340035 A1 | 12/2013 | Uziel et al. |
| 2014/0075004 A1 | 3/2014 | Van Dusen et al. |
| 2014/0096215 A1 | 4/2014 | Hessler |
| 2014/0173727 A1 | 6/2014 | Lingafelt et al. |
| 2014/0199663 A1 | 7/2014 | Sadeh-Koniecpol et al. |
| 2014/0205099 A1 | 7/2014 | Christodorescu et al. |
| 2014/0214938 A1 | 7/2014 | Bhatt et al. |
| 2014/0283075 A1 | 9/2014 | Drissel et al. |
| 2014/0325634 A1 | 10/2014 | Iekel-Johnson et al. |
| 2014/0356445 A1 | 12/2014 | Little |
| 2015/0082430 A1 | 3/2015 | Sridhara et al. |
| 2015/0113646 A1 | 4/2015 | Lee et al. |
| 2015/0154263 A1 | 6/2015 | Boddhu et al. |
| 2015/0161386 A1 | 6/2015 | Gupta et al. |
| 2015/0199511 A1 | 7/2015 | Faile, Jr. et al. |
| 2015/0199629 A1 | 7/2015 | Faile, Jr. et al. |
| 2015/0205954 A1 | 7/2015 | Jou et al. |
| 2015/0215325 A1 | 7/2015 | Ogawa |
| 2015/0220625 A1 | 8/2015 | Cartmell et al. |
| 2015/0256550 A1 | 9/2015 | Taylor et al. |
| 2015/0269383 A1 | 9/2015 | Lang et al. |
| 2015/0288709 A1 | 10/2015 | Singhal et al. |
| 2015/0324559 A1 | 11/2015 | Boss et al. |
| 2015/0324563 A1 | 11/2015 | Deutschmann et al. |
| 2015/0326613 A1* | 11/2015 | Devarajan ........... H04L 61/2007 726/1 |
| 2015/0350902 A1 | 12/2015 | Baxley et al. |
| 2016/0021117 A1 | 1/2016 | Harmon et al. |
| 2016/0036844 A1 | 2/2016 | Kopp et al. |
| 2016/0078362 A1 | 3/2016 | Christodorescu et al. |
| 2016/0092774 A1 | 3/2016 | Wang et al. |
| 2016/0105334 A1 | 4/2016 | Boe et al. |
| 2016/0147380 A1 | 5/2016 | Coates et al. |
| 2016/0164922 A1 | 6/2016 | Boss et al. |
| 2016/0226914 A1 | 8/2016 | Doddy et al. |
| 2016/0232353 A1 | 8/2016 | Gupta et al. |
| 2016/0247158 A1 | 8/2016 | Kolotinsky |
| 2016/0261621 A1 | 9/2016 | Srivastava et al. |

(56) References Cited

U.S. PATENT DOCUMENTS

| | | |
|---|---|---|
| 2016/0277360 A1 | 9/2016 | Dwyier et al. |
| 2016/0277435 A1 | 9/2016 | Salajegheh et al. |
| 2016/0286244 A1 | 9/2016 | Chang et al. |
| 2016/0300049 A1 | 10/2016 | Guedalia et al. |
| 2016/0308890 A1 | 10/2016 | Weilbacher |
| 2016/0330219 A1 | 11/2016 | Hasan |
| 2016/0335865 A1 | 11/2016 | Sayavong et al. |
| 2016/0371489 A1 | 12/2016 | Puri et al. |
| 2017/0032274 A1 | 2/2017 | Yu et al. |
| 2017/0053280 A1 | 2/2017 | Lishok et al. |
| 2017/0063888 A1 | 3/2017 | Muddu et al. |
| 2017/0070521 A1 | 3/2017 | Bailey et al. |
| 2017/0104790 A1 | 4/2017 | Meyers et al. |
| 2017/0116054 A1 | 4/2017 | Boddhu et al. |
| 2017/0155669 A1 | 6/2017 | Sudo et al. |
| 2017/0230418 A1 | 8/2017 | Amar et al. |
| 2017/0255938 A1 | 9/2017 | Biegun et al. |
| 2017/0279616 A1 | 9/2017 | Loeb et al. |
| 2017/0286671 A1 | 10/2017 | Chari et al. |
| 2017/0331828 A1 | 11/2017 | Caldera et al. |
| 2018/0004948 A1 | 1/2018 | Martin et al. |
| 2018/0007069 A1 | 1/2018 | Hunt et al. |
| 2018/0018456 A1 | 1/2018 | Chen et al. |
| 2018/0024901 A1 | 1/2018 | Tankersley et al. |
| 2018/0025273 A1 | 1/2018 | Jordan et al. |
| 2018/0027006 A1 | 1/2018 | Zimmermann et al. |
| 2018/0081661 A1 | 3/2018 | Gonzalez del Solar et al. |
| 2018/0082307 A1 | 3/2018 | Ochs et al. |
| 2018/0091520 A1 | 3/2018 | Camenisch et al. |
| 2018/0121514 A1 | 5/2018 | Reisz et al. |
| 2018/0139227 A1 | 5/2018 | Martin et al. |
| 2018/0145995 A1 | 5/2018 | Roeh et al. |
| 2018/0150570 A1 | 5/2018 | Broyd et al. |
| 2018/0191745 A1 | 7/2018 | Moradi et al. |
| 2018/0191766 A1 | 7/2018 | Holeman et al. |
| 2018/0191857 A1 | 7/2018 | Schooler et al. |
| 2018/0204215 A1 | 7/2018 | Hu et al. |
| 2018/0232111 A1 | 8/2018 | Jones et al. |
| 2018/0232426 A1 | 8/2018 | Gomez et al. |
| 2018/0234434 A1 | 8/2018 | Viljoen |
| 2018/0248863 A1 | 8/2018 | Kao et al. |
| 2018/0285363 A1 | 10/2018 | Dennis et al. |
| 2018/0288063 A1 | 10/2018 | Koottayi et al. |
| 2018/0295141 A1 | 10/2018 | Solotorevsky |
| 2018/0332062 A1 | 11/2018 | Ford |
| 2018/0336353 A1 | 11/2018 | Manadhata et al. |
| 2018/0341758 A1 | 11/2018 | Park et al. |
| 2018/0341889 A1 | 11/2018 | Psalmonds et al. |
| 2018/0349684 A1 | 12/2018 | Bapat et al. |
| 2019/0014153 A1 | 1/2019 | Lang et al. |
| 2019/0034625 A1 | 1/2019 | Ford et al. |
| 2019/0052660 A1 | 2/2019 | Cassidy et al. |
| 2019/0095478 A1 | 3/2019 | Tankersley et al. |
| 2019/0158503 A1* | 5/2019 | Bansal ............... H04L 63/0876 |
| 2019/0174319 A1 | 6/2019 | Backholm et al. |
| 2019/0222603 A1* | 7/2019 | Yang .................. H04L 63/1416 |
| 2019/0289021 A1 | 9/2019 | Ford |
| 2019/0294482 A1 | 9/2019 | Li et al. |
| 2019/0354703 A1 | 11/2019 | Ford |
| 2019/0356688 A1 | 11/2019 | Ford |
| 2019/0356699 A1 | 11/2019 | Ford |
| 2019/0387002 A1 | 12/2019 | Ford et al. |
| 2019/0387003 A1 | 12/2019 | Ford et al. |
| 2019/0392419 A1 | 12/2019 | Deluca et al. |
| 2020/0034462 A1 | 1/2020 | Narayanaswamy et al. |
| 2020/0036740 A1 | 1/2020 | Ford |
| 2020/0077265 A1* | 3/2020 | Singh ..................... H04L 67/16 |
| 2020/0089692 A1 | 3/2020 | Tripathi et al. |
| 2020/0117546 A1* | 4/2020 | Wong .................. G06F 16/137 |
| 2020/0334025 A1 | 10/2020 | Wang et al. |

OTHER PUBLICATIONS

Marinescu, Dan C., Cloud Computing and Computer Clouds, University of Central Florida, 2012, pp. 1-246.

S. Chambi et al., "Better bitmap performance with Roaring bitmaps," arXiv:1402.6407v10 [cs.DB] (Mar. 15, 2016).

Jianguo Wang et al., "An Experimental Study of Bitmap Compression vs. Inverted List Compression," SIGMOD 2017: Proceedings of the 2017 ACM Int'l Conf. on Management of Data, pp. 993-1008 (May 2017).

L. F. Lafuerza et al., Exact Solution of a Stochastic Protein Dynamics Model with Delayed Degradation, Phys. Rev. E 84, 051121, Nov. 18, 2011, pp. 1-8.

Zoubin Ghahramani, Bayesian nonparametrics and the probabilistic approach to modelling, Philosophical Transactions A of the Royal Society, vol. 371 Issue: 1984, Published Dec. 31, 2012, pp. 1-20.

Elena Zheleva et al., Higher-order Graphical Models for Classification in Social and Affiliation Networks, NIPS 2010 Workshop on Networks Across Disciplines: Theory and Applications, Whistler BC, Canada, 2010, pp. 1-7.

Varun Chandola et al., Anomaly Detection: A Survey, ACM Computing Surveys, vol. 41, No. 3, Article 15, Jul. 2009, pp. 15.1-58.1.

Judea Pearl, The Causal Foundations of Structural Equation Modeling, Technical Report R-370, Computer Science Department, University of California, Los Angeles, also Chapter 5, R. H. Hoyle (Ed.), Handbook of Structural Equation Modeling, New York, Guilford Press, Jun. 4, 2012, pp. 68-91.

Yueh-Hsuan Chiang, Towards Large-Scale Temporal Entity Matching, Dissertation Abstract, University of Wisconsin-Madison, 2013.

Furong Li, Linking Temporal Records for Profiling Entities, 2015, SIGMOD '15 Proceedings of the 2015 ACM SIGMOD International Conference on Management of Data, pp. 593-605, https://users.soe.ucsc.edu/~tan/papers/2015/modf445-li.pdf.

Peter Christen et al., Adaptive Temporal Entity Resolution on Dynamic Databases, Apr. 2013, http://users.cecs.anu.edu.au/~Peter.Christen/publications/christen2013pakdd-slides.pdf.

Wikipedia, Categorical Distribution, edited Jul. 28, 2018, https://en.wikipedia.org/wiki/Categorical_distribution.

Wikipedia, One-Hot, edited May 22, 2018, https://en.wikipedia.org/wiki/One-hot.

Sean Barnum, Standardized Cyber Threat Intelligence Information with the Structured Threat Information eXpression (STIX) Whitepaper v1.1 (Feb. 20, 2014).

Xiang Sun et al., Event Detection in Social Media Data Streams, IEEE International Conference on Computer and Information Technology; Ubiquitous Computing and Communications; Dependable, Automatic and Secure Computing; Persuasive Intelligence and Computing, pp. 1711-1717, Dec. 2015.

Mesaros et al., Latent Semantic Analysis in Sound Event Detection, 19th European Signal Processing Conference (EUSIPCO 2011), pp. 1307-1311, 2011.

Crandall et al., Inferring Social Ties from Geographic Coincidences, PNAS, vol. 107, No. 52, 2010, pp. 22436-22441, 2010.

Ross et al., Bully Prevention in Positive Behavior Support, Journal of Applied Behavior Analysis, 42(4), pp. 747-759, 2009.

Matt Klein, How to Erase Your iOS Device After Too Many Failed Passcode Attempts, https://www.howtogeek.com/264369/how-to-erase-your-ios-device-after-too-many-failed-passcode-attempts/, Jul. 28, 2016.

Github, The Z3 Theorem Prover, retrieved from internet May 19, 2020, https://github.com/Z3Prover/z3.

John Backes et al., Semantic-based Automated Reasoning for AWS Access Policies using SMT, 2018 Formal Methods in Computer Aided Design (FMCAD), Oct. 30-Nov. 2, 2018 https://d1.awsstatic.com/Security/pdfs/Semantic_Based_Automated_Reasoning_for_AWS_Access_Policies_Using_SMT.pdf.

Barrere et al., Vulnerability Assessment in Autonomic Networks and Services: A Survey, IEEE, Aug. 30, 2013, vol. 16, issue. 2, pp. 988-1004.

Burns et al., Automatic Management of Network Security Policy, IEEE, Jun. 14, 2001, pp. 12-26.

(56) References Cited

OTHER PUBLICATIONS

Singh et al., Container-Based Microservice Architecture for Cloud Applications, International Conference on Computing, Communication and Automation (ICCCA2017), 2017.

* cited by examiner

SYSTEM AND METHOD FOR EFFICIENT FINGERPRINTING IN CLOUD MULTITENANT DATA LOSS PREVENTION

BACKGROUND OF THE INVENTION

Field of the Invention

This disclosure relates generally to data loss prevention, and more specifically, to systems and method for efficient and accurate detection of fingerprint information.

Description of the Related Art

Information and knowledge created and accumulated by organizations and businesses are, in many cases, their most valuable assets. Unauthorized dissemination of intellectual property, financial information and other confidential or sensitive information can significantly damage a company's reputation and competitive advantage. In addition, individuals' private information inside organizations, as well as private information of clients, customers, and business partners may include sensitive details that can be abused by users with criminal intentions.

Apart from the damage to business secrecy and reputation, regulations within the United States and abroad pose substantial legal liabilities for information leakage. Regulations such as the Health Insurance Portability and Accountability Act (HIPAA), the Gramm-Leach-Bliley Act (GLBA) and the privacy-protecting laws of various states and nations imply that the information assets within organizations should be monitored and Subjected to an information protection policy in order to protect client's privacy and to mitigate the risks of potential misuse and fraud.

Information fingerprinting is one mechanism for monitoring and blocking unauthorized dissemination and usage of confidential and otherwise sensitive information. To generate a fingerprint of information within a file, the file can be preprocessed and divided into fragments. Preprocessing can include normalizing the text in a document to a standard format (e.g., converting text to lowercase letters, removal of common words, and reducing words to their stem or root). Hashes of the fragments, or portions thereof, can be used to generate fingerprints of the file information. The set of hashes can be subsequently post-selected to reduce storage and enhance performance.

In order to assess the similarity between texts of different files, fingerprints are generated from the files and the fingerprints are compared. Similarity measures are used to determine whether a number of common fingerprints of the various file fragments is greater than a predetermined threshold. If they are, then additional data protection methods can be utilized to prevent operations involving the tested file.

But for at least the reason that fingerprint size is proportional to the size of the fingerprinted content, fingerprinting large amounts of data, such as that found in an enterprise network in a manner that will facilitate robust identification, requires allocation of significant memory resources. Compact repository solutions, such as a fast proof of non-existence hash repository, can address some of the memory resource allocation issues, but can suffer from increased rates of false positives as the amount of fingerprinted data increases. Further, typical compact repository solutions do not include metadata on the source of the hashes and therefore cannot provide information regarding the amount or identification of the matched data in the tested file as compared to the protected file. In addition, while efficiency of analysis is faster when the repository file is local to the files being analyzed, distribution of compact repository files is non-trivial given the need for updating the files. Thus, it is desirable to provide a memory efficient and communication efficient solution for distributed data infrastructures, such as cloud services.

SUMMARY OF THE INVENTION

A data loss prevention mechanism for a cloud-based security analytics system is provided that utilizes a compact repository that improves the ratio of false positives over traditional methods, maintains a small data size, permits distribution of compact repository files to a large number of analyzing nodes, and provides metadata for matched events. A compressed bitmap of information found in a compact repository is used, thereby improving the utilization of storage space for a repository containing information associated with a significant number of data fingerprints. Compression further allows for a larger entry size in the compact repository, thereby providing a lower false positive rate. A mechanism for distributing updates to compact repositories residing on cloud servers is provided by updating a central server and propagating the updates to remote servers. Identification of secured data associated with unstructured data fingerprints is also handled using distributed reference to a centralized fingerprint repository.

In one embodiment, an information handling system is provided that is configured as a cloud policy engine. The information handling system includes a processor, a network interface coupled to the processor and communicatively coupled to a first network, a first memory storing a compact repository that stores a set of compact fingerprints and a second memory storing instructions executable by the processor. Each set of compact fingerprints is associated with one or more hashes of electronic data to which a transmission policy is applied. The one or more hashes of electronic data are filtered using a Bloom filter that includes an entry length of $2^{32}$ bits. The filtered hash values are compressed. The instructions are configured to compare a set of data accessed by an entity at the information handling system with an entry of the compact repository to determine whether the set of data has an existing match in a fingerprint repository including the one or more hashes of the electronic data, and apply the transmission policy to the access of the set of data if the set of data has an existing match.

In one aspect of the above embodiment, the instructions executable by the processor are further configured to, if the set of data has an existing match, transmit an incident report using the network interface to a data loss prevention server located in a second network, where the second network includes a node storing the fingerprint repository. In a further aspect, the incident report includes one or more hashes of the set of data for comparison against records in the fingerprint repository when the set of data includes unstructured data.

In another aspect of the above embodiment, the instructions are further configured to transmit, using the network interface, a poll message requesting a status of an update to the compact repository, where the poll message is transmitted to a cloud management node. In a further aspect, if an update is present, the instructions are further configured to receive the updated compact repository and store the updated compact repository in the first memory. In another further aspect, the cloud management node includes an edge device communicatively coupled to the first network and a second network. In still a further aspect, the second network includes a fingerprint repository node storing the fingerprint repository.

In yet another aspect of the above embodiment, the first memory stores a set of compact repositories, the compact repository is one of the set of compact repositories, and each member of the set of compact repositories has an associated transmission policy.

Another embodiment provides a method for securing secured data in a data loss prevention system. The method includes performing a hash of the secured data where the secured data has an associated access policy, storing the hash of the secured data in a fingerprint repository where the stored hash of the secured data is a fingerprint of the secured data, generating a compact representation of the fingerprint of the secured data using a Bloom filter, compressing the compact representation, and storing the compressed compact representation as an entry in a compact repository.

In one aspect of the above embodiment, compressing the compact representation includes using a Roaring bitmap on the compact representation. In another aspect of the above embodiment, the method further includes performing said compressing to improve a false positive rate of the compact representation by logically increasing a number of elements of the Bloom filter. In a further aspect, the number of elements of the Bloom filter is logically set to $2^{32}$.

In another aspect of the above embodiment, the method further includes identifying data to be accessed, performing a hash of the data to be accessed, generating a compact representation of the hash of the data to be accessed using the Bloom filter, compressing the compact representation of the hash of the data to be accessed, comparing the compressed version of the compact representation of the hash of the data to be accessed against entries of the compact repository, and allowing the access to the data to be accessed if there is no matching entry in the compact repository. In a further aspect, the method includes comparing the hash of the data to be accessed with entries stored in the fingerprint repository is there is a matching entry in the compact repository, and identifying the secured data associated with a matching entry of the fingerprint repository.

Another embodiment provides a data loss prevention network environment that includes a first information handling system configured to store a fingerprint repository and a second information handling system. The fingerprint repository includes one or more entries and each of the one or more entries includes a hash of data associated with an access policy and an identifier of the data associated with the access policy. The second information handling system is configured to: store a compact repository, where the compact repository includes one or more compact representations of the entries stored in the fingerprint repository, the one or more compact representations are generated using a Bloom filter on the entries of the fingerprint repository and compressing the Bloom filtered data, and the Bloom filter provides an entry of length $2^{32}$; compare information associated with data requested to be accessed stored at the second information handling system against the compact representations stored in the compact repository; and allow access to the data requested to be accessed when there is no matching entry in the compact repository.

In one aspect of the above embodiment, the second information handling system is further configured to perform a hash of the data requested to be accessed, generate a compact representation of the hash of the data requested to be accessed using a Bloom filter, and compress the compact representation of the hash of the data requested to be accessed to generate the information associated with the data requested to be accessed. In a further aspect, the second information handling system is further configure to transmit the hash of the data requested to be accessed to the first information handling system when there is a matching entry in the compact repository, and apply the access policy to the access of the data to be accessed. The first information handling system is further configured to receive the hash of the data requested to be accessed, compare the hash of the data requested to be accessed with one or more entries of the fingerprint repository, and identify the data associated with the access policy from a matching entry of the fingerprint repository. In still a further aspect, the second information handling system is further configure to transmit an incident report to a third information handling system when there is a matching entry in the compact repository and the incident report includes an indication that the second information handling system restricted access to the data requested to be accessed under the access policy. The first information handling system is further configured to transmit an identity of the secured data associated with the matching entry of the fingerprint repository to the third information handling system. The third information handling system is configured to associate the identity of the secured data with the incident report, and generate a report including information from the incident report and the identity of the secured data.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Embodiments of the present invention provide a data loss prevention mechanism for a cloud-based security analytics system by utilizing a compact repository that improves the ratio of false positives over traditional methods, maintains a small data size, permits distribution of compact repository files to a large number of analyzing nodes, and provides metadata for matched events. Embodiments provide these advantages by utilizing a compressed bitmap of information found in a compact repository, therefore improving the utilization of storage space for a repository containing information associated with a significant number of data fingerprints without a significant increase in computation due to decompression. Compression further allows for a larger entry size in the compact repository, which provides a corresponding lower false positive rate. Embodiments further provide a mechanism for distributing updates to compact repositories residing on cloud servers by updating a central server and propagating the updates to remote servers. Identification of secured data associated with unstructured data fingerprint information is also handled through a distributed reference to a centralized fingerprint repository.

Certain aspects of embodiments of the present invention are implemented using information handling systems in a distributed network, or set of networks, that are configured to provide a security analytics environment that includes data loss prevention. In addition to information handling systems configured as network nodes within an enterprise network, the environment can include cloud-based systems that are nodes on networks external to the enterprise network but serving data for which access is desired to be controlled.

Figure 1:
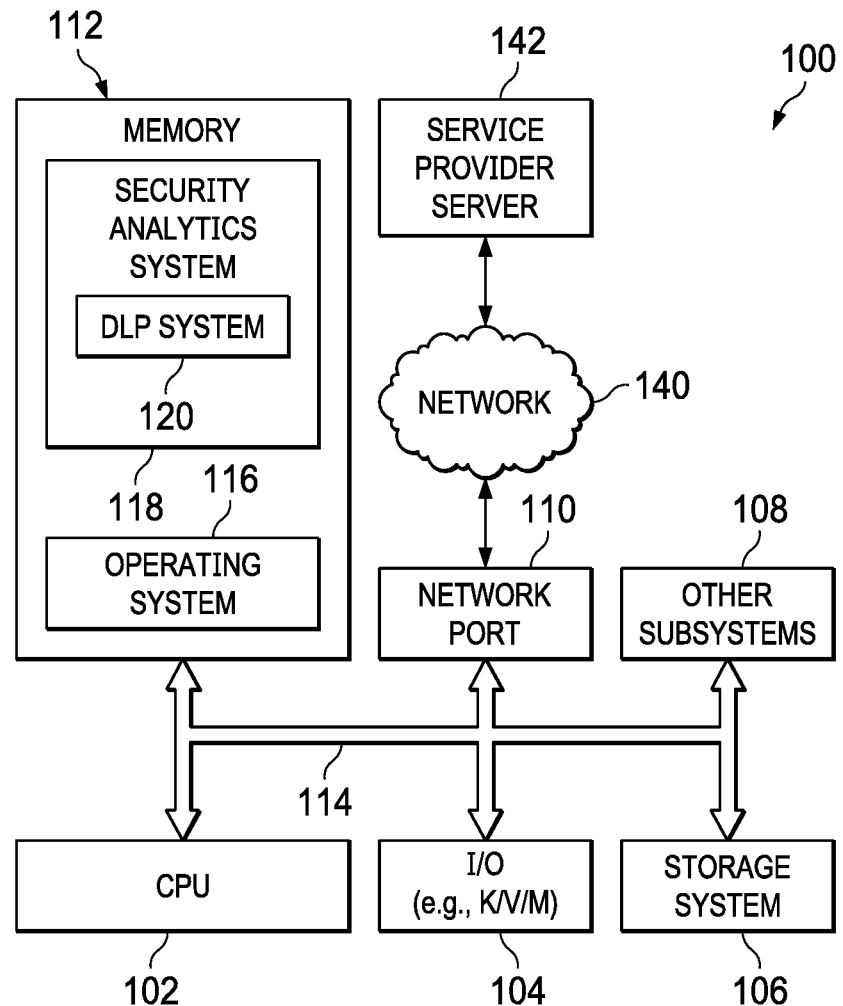
FIG. 1 depicts an exemplary client computer in which the present invention may be implemented.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a gesture input device, and associated controllers, a storage system 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further includes operating system (OS) 116 and in various embodiments may also include a security analytics system 118. In one embodiment, the information handling system 100 is able to download the security analytics system 118 from the service provider server 142. In another embodiment, the security analytics system 118 is provided as a service from the service provider server 142.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a mobile device such as a tablet or smartphone, a consumer electronic device, a connected "smart device," a network appliance, a network storage device, a network gateway device, a server or collection of servers or any other suitable device and may vary in size, shape, performance, functionality, and price. The information handling system may include volatile and/or non-volatile memory, and one or more processing resources such as a central processing unit (CPU) or hardware or software control logic. Additional components of the information handling system may include one or more storage systems, one or more wired or wireless interfaces for communicating with other networked devices, external devices, and various input and output (I/O) devices, such as a keyboard, a gesture input device (e.g., mouse, trackball, trackpad, touchscreen, and touch sensitive display device), a microphone, speakers, a track pad, a touchscreen and a display device (including a touch sensitive display device). The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or solid state drive), a sequential access storage device (e.g., a tape disk drive), optical storage device, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

In various embodiments, the security analytics system 118 performs a security analytics operation. In certain embodiments, the security analytics operation improves processor efficiency, and thus the efficiency of the information handling system 100, by facilitating security analytics functions. As will be appreciated, once the information handling system 100 is configured to perform the security analytics operation, the information handling system 100 becomes a specialized computing device specifically configured to perform the security analytics operation and is not a general-purpose computing device. Moreover, the implementation of the security analytics system 118 on the information handling system 100 improves the functionality of the information handling system 100 and provides a useful and concrete result of performing security analytics functions to mitigate security risk. In certain embodiments, the security analytics system 118 may be implemented to include a data loss protection (DLP) system 120. In certain embodiments, the DLP system 120 may be implemented to perform various DLP operations, described in greater detail herein.

Figure 2:
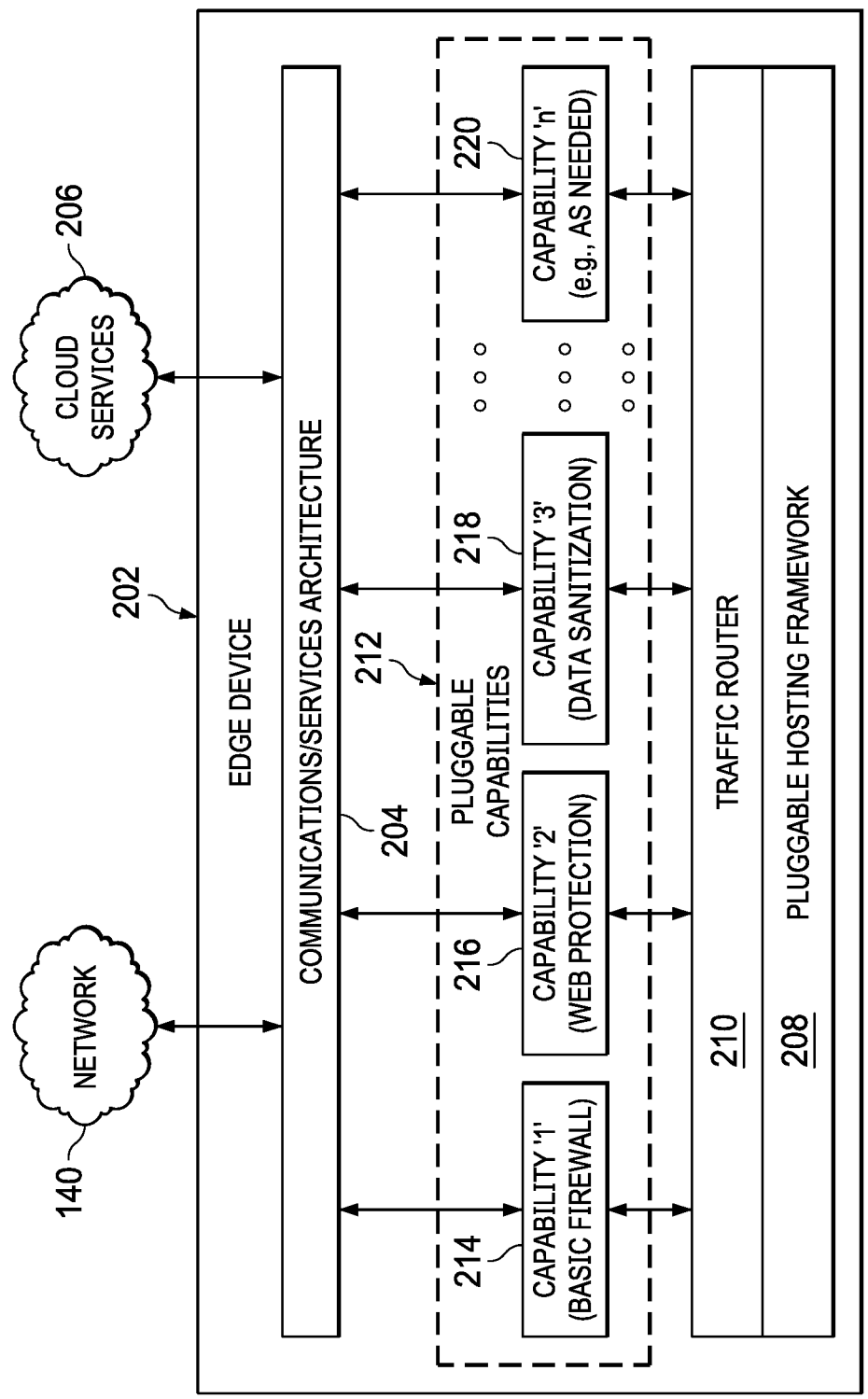
FIG. 2 is a simplified block diagram of an edge device.

FIG. 2 is a simplified block diagram of an edge device implemented in accordance with an embodiment of the invention. As used herein, an edge device, such as the edge device 202 shown in FIG. 2, broadly refers to a device providing an entry point into a network 140. Examples of such edge devices 202 may include routers, routing switches, integrated access devices (IADs), multiplexers, wide-area network (WAN) access devices, and network security appliances. In certain embodiments, the network 140 may be a private network (e.g., an enterprise network), a semi-public network (e.g., a service provider core network), or a public network (e.g., the Internet).

Skilled practitioners of the art will be aware that edge devices 202 are often implemented as routers that provide authenticated access to faster, more efficient backbone and core networks. Furthermore, current industry trends include making edge devices 202 more intelligent, which allows core devices to operate at higher speed as they are not burdened with additional administrative overhead. Accordingly, such edge devices 202 often include Quality of Service (QoS) and multi-service functions to manage different types of traffic. Consequently, it is common to design core networks with switches that use routing protocols such as Open Shortest Path First (OSPF) or Multiprotocol Label Switching (MPLS) for reliability and scalability. Such approaches allow edge devices 202 to have redundant links to the core network, which not only provides improved reliability, but enables enhanced, flexible, and scalable security capabilities as well.

In certain embodiments, the edge device 202 may be implemented to include a communications/services architecture 204, various pluggable capabilities 212, a traffic router 210, and a pluggable hosting framework 208. In certain embodiments, the communications/services architecture 202 may be implemented to provide access to and from various networks 140, cloud services 206, or a combination thereof. In certain embodiments, the cloud services 206 may be provided by a cloud infrastructure familiar to those of skill in the art. In certain embodiments, the edge device 202 may be implemented to provide support for a variety of generic services, such as directory integration, logging interfaces, update services, and bidirectional risk/context flows associated with various analytics. In certain embodiments, the edge device 202 may be implemented to provide temporal information, described in greater detail herein, associated with the provision of such services.

In certain embodiments, the edge device 202 may be implemented as a generic device configured to host various network communications, data processing, and security management capabilities, such as the data loss prevention (DLP) capabilities described below. In certain embodiments, the pluggable hosting framework 208 may be implemented to host such capabilities in the form of pluggable capabilities 212. In certain embodiments, the pluggable capabilities 212 may include capability '1' 214 (e.g., basic firewall), capability '2' 216 (e.g., general web protection), capability '3' 218 (e.g., data sanitization), and so forth through capability 'n' 220, which may include capabilities needed for a particular operation, process, or requirement on an as-needed basis.

In certain embodiments, the pluggable capabilities 212 may be sourced from various cloud services 206. In certain embodiments, the pluggable hosting framework 208 may be implemented to provide certain computing and communication infrastructure components, and foundation capabilities, required by one or more of the pluggable capabilities 212. In certain embodiments, the pluggable hosting framework 208 may be implemented to allow the pluggable capabilities 212 to be dynamically invoked. Skilled practitioners of the art will recognize that many such embodiments are possible. Accordingly, the foregoing is not intended to limit the spirit, scope or intent of the invention.

Figure 3:
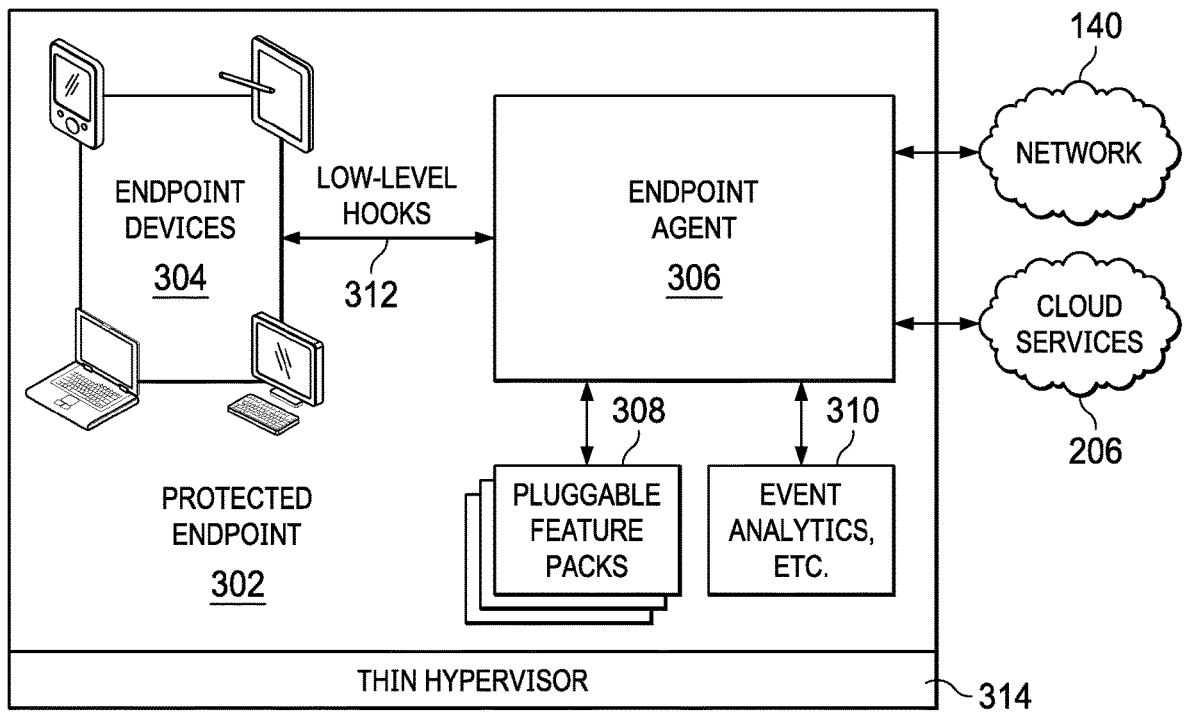
FIG. 3 is a simplified block diagram of an endpoint agent.

FIG. 3 is a simplified block diagram of an endpoint agent implemented in accordance with an embodiment of the invention. As used herein, an endpoint agent 306 broadly refers to a software agent used in combination with an endpoint device 304 to establish a protected endpoint 302. Skilled practitioners of the art will be familiar with software agents, which are computer programs that perform actions on behalf of a user or another program. In various approaches, a software agent may be autonomous or work together with another agent or a user. In certain of these approaches the endpoint agent is implemented to autonomously decide if a particular action is appropriate for a given event, such as an observed entity behavior. For example, in certain embodiments of the present invention, the endpoint agent can autonomously determine whether to trigger stimuli and observe additional entity behavior associated with an endpoint device.

An endpoint device 304, as likewise used herein, refers to an information processing system such as a personal computer, a laptop computer, a tablet computer, a personal digital assistant (PDA), a smart phone, a mobile telephone, a digital camera, a video camera, or other device capable of storing, processing and communicating data, such as information handling system 100. In certain embodiments, the communication of the data may take place in real-time or near-real-time. As used herein, real-time broadly refers to processing and providing information within a time interval brief enough to not be discernable by a user.

A protected endpoint 302 broadly refers to a policy-based approach to network security that typically requires endpoint devices 304 to comply with certain criteria before they are granted access to network resources. As an example, a given endpoint device 304 may be required to have a particular operating system (OS), or version thereof, a Virtual Private Network (VPN) client, anti-virus software with current updates, and so forth. In certain embodiments, the protected endpoint 302 may be implemented to perform operations associated with providing real-time resolution of the identity of an entity at a particular point in time, as described in greater detail below. In certain embodiments, the protected endpoint 302 may be implemented to provide temporal information, such as timestamp information, associated with such operations.

In certain embodiments, the real-time resolution of the identity of an entity at a particular point in time may be based upon contextual information associated with a given entity behavior. As used herein, contextual information broadly refers to any information, directly or indirectly, individually or in combination, related to a particular entity behavior. In certain embodiments, entity behavior may include an entity's physical behavior, cyber behavior, or a combination thereof. As likewise used herein, physical behavior broadly refers to any entity behavior occurring within a physical realm. More particularly, physical behavior may include any action enacted by an entity that can be objectively observed, or indirectly inferred, within a physical realm.

As an example, a user may attempt to use an electronic access card to enter a secured building at a certain time. In this example, the use of the access card to enter the building is the action and the reading of the access card makes the user's physical behavior electronically-observable. As another example, a first user may physically transfer a document to a second user, which is captured by a video surveillance system. In this example, the physical transferal of the document from the first user to the second user is the action. Likewise, the video record of the transferal makes the first and second user's physical behavior electronically-observable. As used herein, electronically-observable entity behavior broadly refers to any behavior exhibited or enacted by an entity that can be electronically observed. As will be discussed more fully below, some embodiments of the present invention are triggered by certain physical and cyber behavior and are configured to generate additional information related to contextual information of an entity, such as a user.

Cyber behavior, as used herein, broadly refers to any behavior occurring in cyberspace, whether enacted by an individual user, a group of users, or a system acting at the behest of an individual user, a group of users, or an entity. More particularly, cyber behavior may include physical, social, or mental actions that can be objectively and electronically observed, or indirectly inferred, within cyberspace. As an example, a user may use an endpoint device 304 to access and browse a particular website on the Internet. In this example, the individual actions performed by the user to access and browse the website constitute a cyber behavior. As another example, a user may use an endpoint device 304 to download a data file from a particular system at a particular point in time. In this example, the individual actions performed by the user to download the data file, and associated temporal information, such as a time-stamp associated with the download or a fingerprint associated with the data file, constitute a cyber behavior.

As likewise used herein, cyberspace broadly refers to a network 140 environment capable of supporting communication between two or more entities. In certain embodiments, the entity may be a user, an endpoint device 304, or various resources, described in greater detail herein. In certain embodiments, the entities may include various endpoint devices 304 or resources operating at the behest of an entity, such as a user. In certain embodiments, the communication between entities may include audio, image, video, text, or binary data.

As described in greater detail herein, the contextual information may include a user's authentication factors. Contextual information may likewise include various temporal identity resolution factors, such as identification factors associated with the entity, the date/time/frequency of various entity behaviors, the entity's location, the entity's role or position in an organization, and their associated access rights. Other contextual information may likewise include various user interactions, whether the interactions are with an endpoint device 304, a network 140, a resource, or another user. In certain embodiments, entity behaviors, and their related contextual information, may be collected at particular points of observation, and at particular points in time, described in greater detail herein. In certain embodiments, a protected endpoint 302 may be implemented as a point of observation for the collection of entity behavior and contextual information.

In certain embodiments, endpoint agent 306 may be implemented to universally support a variety of operating systems. In certain embodiments, the endpoint agent may be implemented to interact with endpoint device 304 through the use of low-level hooks 312 at the operating system level. It will be appreciated that the use of low-level hooks allows the endpoint agent to subscribe to multiple events through a single hook. Consequently, multiple functionalities provided by endpoint agent 306 can share a single data stream, using only those portions of the data stream they may individually need. Accordingly, system efficiency can be improved, and operational overhead reduced.

In certain embodiments, endpoint agent 306 may be implemented to provide a common infrastructure for pluggable feature packs 308. In various embodiments, the pluggable feature packs 308 may provide certain security management functionalities. Examples of security management functionalities include various anti-virus and malware detection, data loss protection (DLP), insider threat detection, and so forth. In certain embodiments, the security management functionalities can include a mechanism to develop additional information regarding entity activity context, as described in greater detail below.

In certain embodiments, a particular pluggable feature pack 308 is invoked as needed by endpoint agent 306 to provide a given functionality. In certain embodiments, individual features of a particular pluggable feature pack 308 are invoked as needed. It will be appreciated that the ability to invoke individual features of a pluggable feature pack 308, without necessarily invoking all such features, will likely improve the operational efficiency of the endpoint agent 306 while simultaneously reducing operational overhead. Accordingly, the endpoint agent 306 can self-optimize in certain embodiments by using the common infrastructure and invoking only those pluggable components that are applicable or needed for a given user behavior.

In certain embodiments, the individual features of a pluggable feature pack 308 are invoked by endpoint agent 306 according to the occurrence of a particular user behavior. In certain embodiments, the individual features of a pluggable feature pack 308 are invoked by the endpoint agent 306 according to the occurrence of a particular temporal event, described in greater detail herein. In certain embodiments, the individual features of a pluggable feature pack 308 are invoked by the endpoint agent 306 at a particular point in time. In these embodiments, the method by which a given user behavior, temporal event, or point in time is selected is a matter of design choice.

In certain embodiments, endpoint agent 306 may be implemented with additional functionalities, such as event analytics 310. In certain embodiments, the event analytics functionality may include analysis of various user behaviors, described in greater detail herein.

Figure 4:
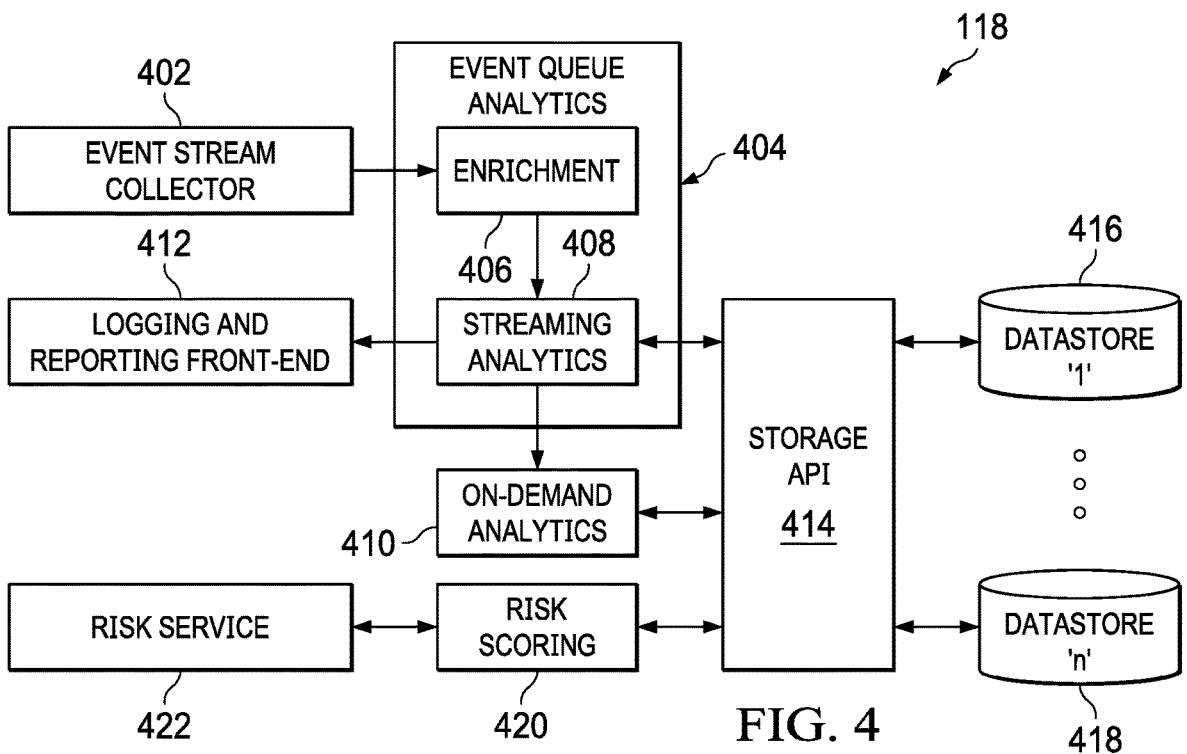
FIG. 4 is a simplified block diagram of a security analytics system.

FIG. 4 is a simplified block diagram of a security analytics system implemented in accordance with an embodiment of the invention. In certain embodiments, the security analytics system 118 shown in FIG. 4 may include an event queue analytics 404 sub-system, described in greater detail herein. In certain embodiments, event queue analytics 404 subsystem may be implemented to include an enrichment 406 module and a streaming analytics 408 module. In certain embodiments, the security analytics system 118 may be implemented to provide logging storage, reporting, and analytics capable of performing streaming 408 and on-demand 410 analytics operations. In certain embodiments, such operations may be associated with defining and managing a data loss prevention system, detecting entity behavior that may be of analytic utility, adaptively responding to mitigate risk, or a combination thereof, as described in greater detail herein. In certain embodiments, entity behavior of analytic utility may be determined to be anomalous, abnormal, unexpected, malicious, or some combination thereof, as described in greater detail herein.

In certain embodiments, the security analytics system 118 may be implemented to provide a uniform platform for storing events and contextual information associated with various entity behaviors and performing longitudinal analytics. As used herein, longitudinal analytics broadly refers to performing analytics of entity behaviors occurring over a particular period of time. As an example, an entity may iteratively attempt to access certain proprietary information stored in various locations. In addition, the attempts may occur over a brief period of time. To continue the example, the fact that the information the entity is attempting to access is proprietary, that it is stored in various locations, and the attempts are occurring in a brief period of time, in combination, may indicate the entity behavior enacted by the entity is suspicious. As another example, certain entity identifier information (e.g., a username) associated with an entity may change over time. In this example, a change in the entity's username, during a particular period of time or at a particular point in time, may represent suspicious entity behavior.

In certain embodiments, the security analytics system 118 may be implemented to be scalable. In certain embodiments, the security analytics system 118 may be implemented in a centralized location, such as a corporate data center. In these embodiments, additional resources may be added to the security analytics system 118 as needs grow. In certain embodiments, the security analytics system 118 may be implemented as a distributed system. In these embodiments, the security analytics system 118 may span multiple information handling systems. In certain embodiments, such as those discussed in further detail below, the security analytics system 118 may be implemented in a cloud environment. In certain embodiments, the security analytics system 118 may be implemented in a virtual machine (VM) environment. In such embodiments, the VM environment may be configured to dynamically and seamlessly scale the security analytics system 118 as needed. Skilled practitioners of the art will recognize that many such embodiments are possible. Accordingly, the foregoing is not intended to limit the spirit, scope or intent of the invention.

In certain embodiments, an event stream collector 402 can be implemented to collect event and related contextual information, described in greater detail herein, associated with various entity behaviors. In these embodiments, the method by which the event and contextual information is selected to be collected by the event stream collector 402 is a matter of design choice. In certain embodiments, the event and contextual information collected by the event stream collector 402 may be processed by an enrichment module 406 to generate enriched entity behavior information. In certain embodiments, the enrichment may include certain contextual information related to a particular entity behavior or event. In certain embodiments, the enrichment may include certain temporal information, such as timestamp information, related to a particular entity behavior or event.

In certain embodiments, enriched entity behavior information may be provided by the enrichment module 406 to a streaming 408 analytics module. In turn, the streaming 408 analytics module may provide some or all of the enriched entity behavior information to an on-demand 410 analytics module. As used herein, streaming 408 analytics broadly refers to analytics performed in near real-time on enriched entity behavior information as it is received. Likewise, on-demand 410 analytics broadly refers herein to analytics performed, as they are requested, on enriched entity behavior information after it has been received. In certain embodiments, the enriched entity behavior information may be associated with a particular event. In certain embodiments, the enrichment 406 and streaming analytics 408 modules may be implemented to perform event queue analytics 404 operations, as described in greater detail herein.

In certain embodiments, the on-demand 410 analytics may be performed on enriched entity behavior associated with a particular interval of, or point in, time. In certain embodiments, the streaming 408 or on-demand 410 analytics may be performed on enriched entity behavior associated with a particular user, group of users, one or more non-user entities, or a combination thereof. In certain embodiments, the streaming 408 or on-demand 410 analytics may be performed on enriched entity behavior associated with a particular resource, such as a facility, system, datastore, or service. Those of skill in the art will recognize that many such embodiments are possible. Accordingly, the foregoing is not intended to limit the spirit, scope or intent of the invention.

In certain embodiments, the results of various analytics operations performed by the streaming 408 or on-demand 410 analytics modules may be provided to a storage Application Program Interface (API) 414. In turn, the storage API 412 may be implemented to provide access to various datastores '1' 416 through 'n' 418, which in turn are used to store the results of the analytics operations. In certain embodiments, the security analytics system 118 may be implemented with a logging and reporting front-end 412, which is used to receive the results of analytics operations performed by the streaming 408 analytics module. In certain embodiments, the datastores '1' 416 through 'n' 418 may variously include a datastore of entity identifiers, temporal events, or a combination thereof.

In certain embodiments, the security analytics system 118 may include a risk scoring 420 module implemented to perform risk scoring operations, described in greater detail herein. In certain embodiments, functionalities of the risk scoring 420 module may be provided in the form of a risk management service 422. In certain embodiments, the risk management service 422 may be implemented to perform operations associated with defining and managing an adaptive trust profile (ATP), as described in greater detail herein. In certain embodiments, the risk management service 422 may be implemented to perform operations associated with detecting entity behavior that may be of analytic utility and adaptively responding to mitigate risk, as described in greater detail herein. In certain embodiments, the risk management service 422 may be implemented to provide results of various analytics operations performed by the streaming 406 or on-demand 408 analytics modules. In certain embodiments, the risk management service 422 may be implemented to use the storage API 412 to access various enhanced cyber behavior and analytics information stored on the datastores '1' 414 through 'n' 416. Skilled practitioners of the art will recognize that many such embodiments are possible. Accordingly, the foregoing is not intended to limit the spirit, scope or intent of the invention.

Figure 5:
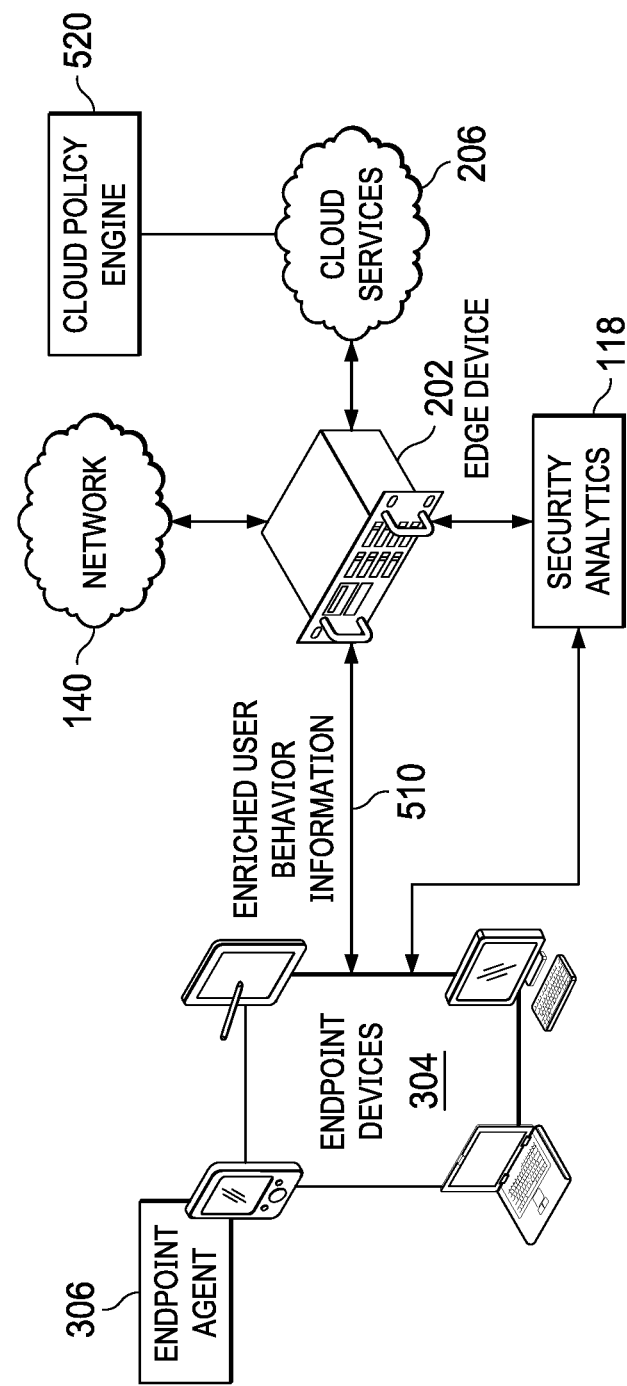
FIG. 5 is a simplified block diagram of an operation of a security analytics system.

FIG. 5 is a simplified block diagram of the operation of a security analytics system implemented in accordance with an embodiment of the invention. In certain embodiments, security analytics system 118 may be implemented to perform operations associated with detecting entity behavior that may be of analytic utility, as described in greater detail herein. In certain embodiments, security analytics system 118 may be implemented in combination with one or more endpoint agents 306, one or more edge devices 202, various cloud services 206, and a network 140 to perform such operations. Cloud services 206 can include, in certain embodiments, one or more cloud policy engines 520 configured to implement aspects of a data loss prevention environment, as will be discussed more fully below.

In certain embodiments, the network edge device 202 may be implemented in a bridge, a firewall, or a passive monitoring configuration. In certain embodiments, the edge device 202 may be implemented as software running on an information handling system. In certain embodiments, the network edge device 202 may be implemented to provide integrated logging, updating and control. In certain embodiments, the edge device 202 may be implemented to receive network requests and context-sensitive user behavior information in the form of enriched user behavior information 510, described in greater detail herein, from an endpoint agent 306, likewise described in greater detail herein.

In certain embodiments, the security analytics system 118 may be implemented as both a source and a sink of user behavior information. In certain embodiments, the security analytics system 118 may be implemented to serve requests for user/resource risk data. In certain embodiments, the edge device 202 and the endpoint agent 306, individually or in combination, may provide certain entity behavior information to the security analytics system 118 using either push or pull approaches familiar to skilled practitioners of the art.

As described in greater detail herein, the edge device 202 may be implemented in certain embodiments to receive enriched user behavior information 510 from the endpoint agent 306. It will be appreciated that such enriched user behavior information 510 will likely not be available for provision to the edge device 202 when an endpoint agent 306 is not implemented for a corresponding endpoint device 304. However, the lack of such enriched user behavior information 510 may be accommodated in various embodiments, albeit with reduced functionality related to operations associated with defining and managing an entity profile, detecting entity behavior that may be normal or of analytic utility, mitigating associated risk, or a combination thereof.

In certain embodiments, a given user behavior may be enriched by an associated endpoint agent 306 attaching contextual information to a request. In certain embodiments, the context is embedded within a network request, which is then provided as enriched user behavior information 510. In certain embodiments, the contextual information may be concatenated, or appended, to a request, which in turn may be provided as enriched user behavior information 510. In these embodiments, the enriched user behavior information 510 may be unpacked upon receipt and parsed to separate the request and its associated contextual information. Certain embodiments of the invention reflect an appreciation that one possible disadvantage of such an approach is that it may perturb certain Intrusion Detection System and/or Intrusion Detection Prevention (IDS/IDP) systems implemented on a network 140.

In certain embodiments, new flow requests may be accompanied by a contextual information packet sent to the edge device 202. In these embodiments, the new flow requests may be provided as enriched user behavior information 510. In certain embodiments, the endpoint agent 306 may also send updated contextual information to the edge device 202 once it becomes available. As an example, an endpoint agent 306 may share a list of files that have been read by a current process at any point in time once the information has been collected. To continue the example, such a list of files may be used to determine which data the endpoint agent 306 may be attempting to exfiltrate.

In certain embodiments, point analytics processes executing on the edge device 202 may request a particular service. As an example, risk scores associated with a particular event on a per-user basis may be requested. In certain embodiments, the service may be requested from the security analytics system 118. In certain embodiments, the service may be requested from various cloud services 206.

In certain embodiments, contextual information associated with a particular entity behavior may be attached to various network service requests. In certain embodiments, the request may be wrapped and then handled by proxy. In certain embodiments, a small packet of contextual information associated with an entity behavior may be sent with a service request. In certain embodiments, service requests may be related to Domain Name Service (DNS), web browsing activity, email, and so forth, all of which are essentially requests for service by an endpoint device 304. In certain embodiments, such service requests may be associated with temporal event information, described in greater detail herein. Consequently, such requests can be enriched by the addition of entity behavior contextual information (e.g., UserAccount, interactive/automated, data-touched, temporal event information, etc.). Accordingly, the edge device 202 can then use this information to manage the appropriate response to submitted requests.

In certain embodiments, the endpoint agent 306 may be implemented to update the security analytics system 118 with user behavior and associated contextual information, thereby allowing an offload of certain analytics processing overhead. In certain embodiments, this approach allows for longitudinal risk scoring, which assesses risk associated with certain user behavior during a particular interval of time. In certain embodiments, the security analytics system 118 may be implemented to access risk scores associated with the same user account, but accrued on different endpoint devices 304. It will be appreciated that such an approach may prove advantageous when an adversary is "moving sideways" through a network environment, using different endpoint devices 304 to collect information.

In certain embodiments, the security analytics system 118 may be primarily oriented to applying risk mitigations in a way that maximizes security effort return-on-investment (ROI). This approach can be accomplished by providing additional contextual and entity behavior information associated with entity requests. As an example, a web gateway may not concern itself with why a particular file is being requested by a certain entity at a particular point in time. Accordingly, if the file cannot be identified as malicious or harmless, there is no context available to determine how, or if, to proceed. To extend the example, the edge device 202 and security analytics system 118 may be coupled such that requests can be contextualized and fitted into a framework that evaluates their associated risk. Certain embodiments of the invention reflect an appreciation that such an approach works well with web-based data loss protection (DLP) approaches, as each transfer is no longer examined in isolation, but in the broader context of an identified entity's actions, at a particular time, on the network 140.

As another example, the security analytics system 118 may be implemented to perform risk scoring processes to decide whether to block or allow unusual flows. In various embodiments, the risk scoring processes may be implemented to include certain aspects of eXtensible Access Control Markup Language (XACML) approaches known to skilled practitioners of the art. In certain embodiments, XACML obligations may be implemented to block or allow unusual flows. In certain embodiments, an XACML obligation may be implemented as a directive from a policy decision point (PDP) to a policy enforcement point (PEP) regarding what must be performed before or after a flow is approved.

In certain embodiments, the security analytics system 118 may be primarily oriented to maximally leverage contextual information associated with various entity behaviors within the system. In certain embodiments, data flow tracking is performed by one or more endpoint agents 306, which allows the quantity and type of information associated with particular hosts to be measured. In turn, this information may be used to determine how the edge device 202 handles requests. In certain embodiments, contextual information regarding an event can be further developed through actively applying stimuli to a user entity thereby triggering additional events that can be provided to risk scoring 420 module for evaluation.

By contextualizing such entity behavior on the network 140, the security analytics system 118 can provide intelligent protection, making decisions that make sense in the broader context of an organization's activities. Certain embodiments of the invention reflect an appreciation that one advantage to such an approach is that information flowing through an organization, and the networks they employ, should be trackable, and substantial data breaches preventable. Skilled practitioners of the art will recognize that many such embodiments and examples are possible. Accordingly, the foregoing is not intended to limit the spirit, scope or intent of the invention.

In order to enhance web-based data loss prevention (DLP), data files accessed by a user entity using an endpoint device can be checked against a list of secured data files through a variety of methods including information fingerprinting. Information fingerprinting is one method for monitoring and blocking unauthorized dissemination and usage of confidential and sensitive information. To fingerprint information within a file (either a file known to contain secured data or a file being analyzed to determine whether it contains secured data), the file can be divided into fragments. A subset of the hashes of these file fragments may then be used as fingerprints of the document. For example, a file may be divided into fragments in one of two ways: 1) division and 2) phrasing.

"Division" comprises dividing the file into a subsequence of n items known as an n-gram. The divisions covered by these n-grams may overlap (a condition known as "shingling"). N-grams may be generated by applying a 'sliding window' over the text. Each "window" comprises a given number of characters or words, and from the content of each "window" a hash-value is calculated.

"Phrasing" comprises dividing the content into phrases, using a separator, such as commas, semi-colons or sentence boundaries. A hash value is calculated from the content of each phrase. The set of hashes may thereafter be post selected, or "diluted, in order to reduce storage and enhance performance by selecting hash-values that are divisible by a certain integer p. For example, if p=5, then, on average, one-fifth of the hashes will be selected.

To assess the similarity level between two texts (i.e., documents), each text is first canonized by bringing the document into a standard format used by the detection system (for example by converting the textual content to lowercase Unicode letters, removal of common words (also known as "stop words") like "the" and "is" and other "noise", etc.). Additionally, "stemming" may be performed, which comprises reducing inflected (or sometimes derived) words to their stem, base or root form.

A similarity measure is used to compare two fingerprints of canonized texts. One similarity measure is the Jaccard similarity measure, which defines the similarity between documents A and B as:

$$\frac{|A \cap B|}{|A \cup B|}$$

Where the intersection IA n BI is defined by the number of hashes the fingerprints of the two documents have in common.

A fingerprint, $FP(C_M)$, may be defined as the set:

$$FP(C_M)=\{H(X_i)|g(C_M,H(X_i),\xi)=0\}$$

where:

$C_M$=the Mth information item (e.g., a document or a spreadsheet);

H=a universal hash function;

$X_i$=a vector of length N, where N is a size of the sliding window. The vector is generally described by: $X_i[k]=W_k Cr_{i-N+k}$, in which $W_j$ is a weighting factor that determines the shape of the sliding window, and {Cr is an elementary taxonomic unit by which the windows is defined (e.g., words or characters);

g=a selection function (e.g., selecting only those that are divisible by ξ). The selection function g can be a function of the hash itself, but in general also of the document to be fingerprinted (e.g., size of document, average word length, and the like); and ξ, the security parameter, which determines how many hashes will be saved; and ξ=a security parameter. Intuitively, ξ can be viewed as a parameter that determines the size of the holes in a "textual sieve." The holes can determine the size of the maximal excerpt not represented by a hash value. In general, one can select "wider holes" for less sensitive content. The selection of the hashes to be saved can be done in several ways such as by selecting only hashes that are divisible by a number p ("zero mod p"). In this case, ξ=p and $g(C_M,H(X_i),\xi)=H(X_i) \bmod(p)$ Effective similarity measures can require that a fingerprint be sufficiently "faithful" to the original content it represents, such that the similarity of the original content can be measured by the similarity of the fingerprints. Particularly, a similarity level $d(C_A,C_B)$ between two documents, $C_A$ and $C_B$, can be estimated using the similarity between the respective fingerprints $d(FP(C_A), FP(C_B))$. We define the fingerprinting scheme FP to be an "(ε, δ) faithful representation", for some (ε, δ)>0 if: $d(FP(C_A),FP(C_B))<\varepsilon \rightarrow d(C_A, C_B)<\delta$.

Fingerprint size is an obstacle to efficient implementation of document identification. If the system is configured to detect any fragments of the original content that are greater than some pre-defined size (e.g., each fragment or paragraph with more than 50 words), then in order to provide an accurate and robust identification, the size of the fingerprints will be proportional to the size of the fingerprinted content. In a typical enterprise environment, this size can be huge. A substantial reduction in the size of the fingerprints, without hampering accuracy, is therefore desirable especially while employing a distributed fingerprint-based detection at endpoints and in the cloud.

Figure 6:
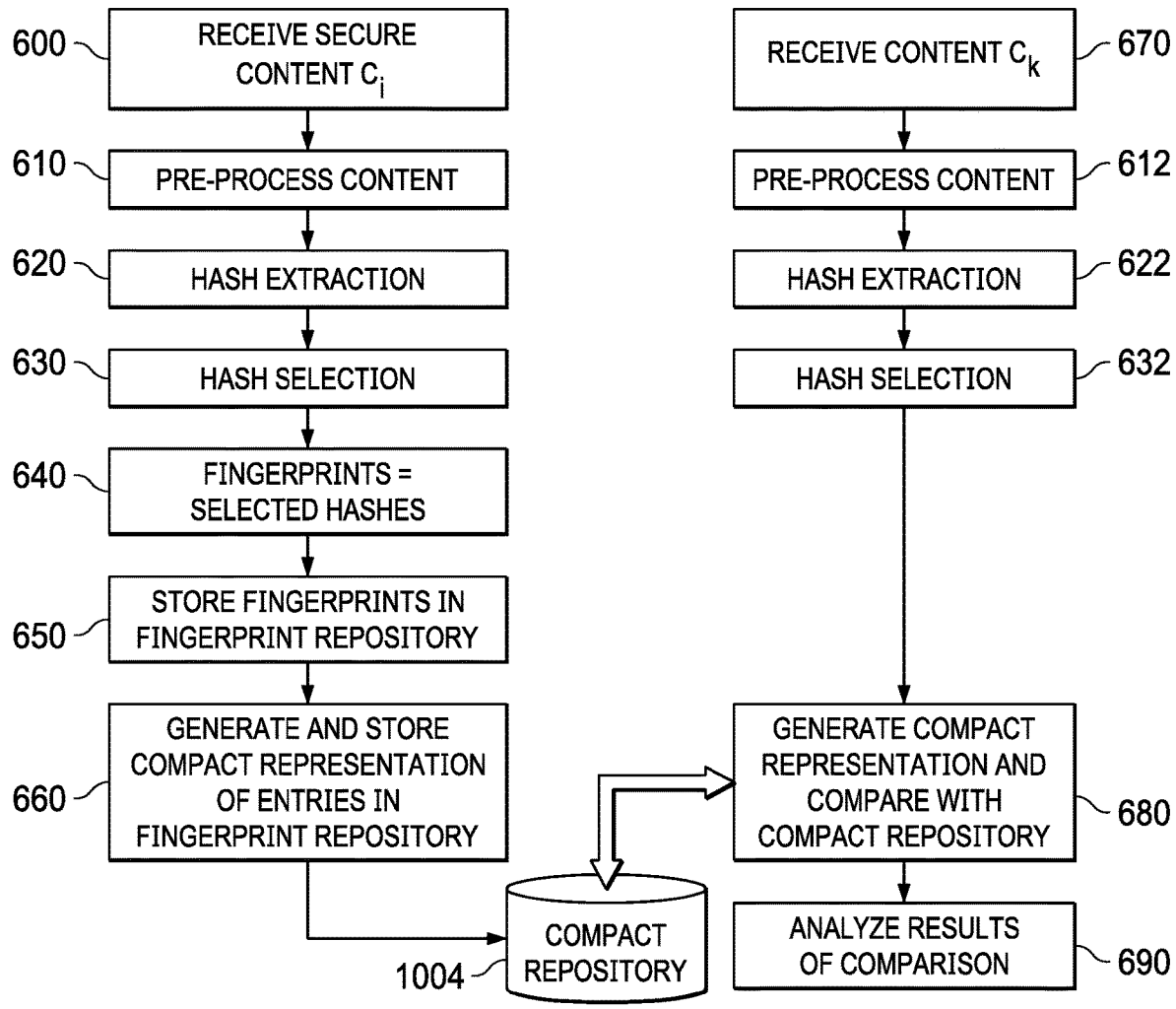
FIG. 6 is a flow diagram illustrating modules that implement a method for detection, storage, and subsequent comparison and identification of fingerprints used by a scanning system.

FIG. 6 illustrates a flow diagram showing the modules that implement a method for detection, storage, and subsequent comparison and identification of fingerprints used by the scanning system 1003. Secure file content $C_i$ (600) (e.g., content of a file desired to be secured from propagation) is pre-processed by a pre-processor (610). For example, in the case where the content is a textual document, the text may be first extracted and then canonized by bringing it up to a standard form (e.g., changing all letters to lowercase, and then removing "stop words" such as common words "the", "and", "or" etc.). After the preprocessing stage, hashes are extracted by a hash extraction module (620) and are thereafter selected by a hash selector module (630). The selected hashes, which are the fingerprints $FP(C_i)$ of the content $C_i$, are stored (640), together with a number or a string that provides an identification of the content $C_i$ and an applicable policy $PL_j$, in a fingerprint repository (650). This identification allows correlating the fingerprints with the original content. In one embodiment, a table can correlate the identifier and other basic properties of the content (e.g., name, location, owner, and the like) can be used for this purpose. An embodiment can then generate a compact representation of the entries in the fingerprint repository (660) as discussed further below, and those compact representations can be stored in compact repository 1004 for matching against target content.

A policy assigned to the content can relate to distribution and usage that determines, for example, the allowed senders, allowed recipients, allowed storage devices, allowed distribution channels, and permitted actions. In most practical situations, the distribution and usage policy is selected from a set of pre-defined organizational policies (e.g., "confidential R&D documents are not allowed to be sent to people outside the organization, and should be stored on a central file server X.").

The concept that content C is subjected to the policy $PL_j$ is denoted by $C_j | - PL_j$. The collection of all the hashes from all the contents that are subjected to the same policy PLj is denoted by $FPL_j = \{FP(C_i) | C_i | - PL_j\}$. From all the selected hashes of the contents that share the same policy $PL_j$, a compact representation $RP_j$ of $FPL_j$, such as a probabilistic representation explained below, can be created and stored at the compact repository 1004.

In order to decide which policy should be applied or enforced when analyzing accessed content, the system may assess the similarity between monitored content (e.g., a content that is disseminated over monitored channels such as email or instant-messaging) and content that was defined as being subjected to the various policies. In this analysis phase, new content, $C_k$ (670) (e.g., a PDF document that is attached to an outgoing email) is analyzed. Content $C_k$ is pre-processed by a pre-processor module in a manner similar to that discussed above with regard to the sensitive content (612). After the preprocessing stage, hashes are extracted by a hash extraction module (622) and are thereafter post-selected by a hash selector module (632). It should be recognized that, in some embodiments, the functionality of the steps 612, 622, and 632 can be performed using modules that perform steps 610, 620, and 630, correspondingly. Alternatively, the functionality can be performed by differing functional modules, for example, modules on a different system than those performing the steps 110, 120, and 130.

A compact representation of content $C_k$ is created and matched against the compact representation $RP_j$ of $FPL_j$ stored in compact repository 1004 (680). A number of matches between the compact representations can then be used in a decision module to decide, based on the assessed similarity between the fingerprinted content $C_i$, and the analyzed content $C_k$, whether a policy $PL_j$ is applicable and should be enforced on $C_k$ (690).

Figure 7:
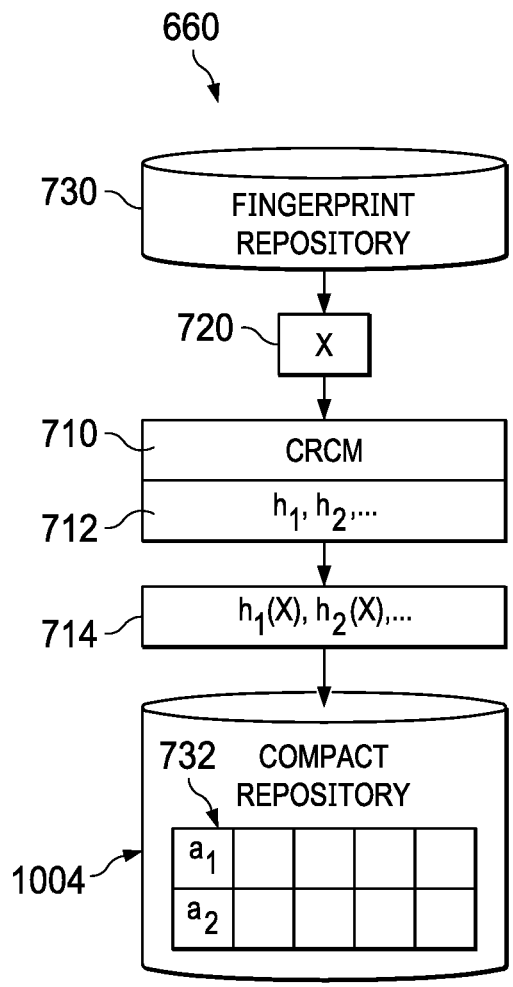
FIG. 7 is a data flow diagram illustrating modules for generating an efficient and compact probabilistic representation of fingerprinted content.

Referring now to FIG. 7, a data flow diagram showing the modules for generating an efficient and compact probabilistic representation of fingerprinted content is shown (e.g., step 660 of FIG. 6). A compact representation creation module (CRCM) 710 accesses a hash X 720 from fingerprint repository 730 (e.g., generated at step 650 above). CRCM 710 employs one or more hash-functions $h_i$ 712 to transform each hash value to an L-bits long binary number, $h_i(X)$ 714. The distribution of the numbers $h_i(X)$ may be close to uniform over the range $1:2^L$. For each of hash-function $h_i$ 714, there is a corresponding array $a_i$ 732 of length $2^L$ stored in compact repository 1004. The elements of the arrays are bits which are all initiated to a have a zero value. After evaluating $h_i(X)$, the element of the array $a_i$ at the address $h_i(X)$ is set to 1; that is, the element is "flagged", indicating the existence of the element X. Because the mapping of elements to addresses in the array is quasi-random, there is a possibility of "collisions" between two different items, i.e., that: $h_i(X1) = h_i(X2)$ while $X1 \neq X2$.

The probability that a collision will occur becomes close to "1" when the number of items become substantially greater than the square root of the number of addresses (i.e., $2^{(L/2)}$), a phenomenon known as "the birthday problem". It is therefore not practical, in general, to positively indicate the existence of a certain item. However, if there is a "0" in at least one of the corresponding arrays $a_i$, then one can be certain that the item does not exist. This feature provides a "fast proof of non-existence" (FPNE) (e.g., a Bloom filter is one such example). The search may therefore be stopped after the first "0" is encountered. Each of the arrays can therefore be considered as a "filter".

The array's optimal length (and the number of bits in the output of the hash function) is computed based on occupancy. In some embodiments, 50% appears optimal, which requires arrays of a size around 1.44 times the number of items. Consider an element Y, which does not exist in the repository. If the array i is half occupied, then the probability that $h_i(Y)$ will match an occupied cell is ½. If there are n arrays that are occupied using different hash functions, $h_1, \ldots h_n$, then the probability of false positive (i.e., that all the cells whose addresses are $h_1(X) \ldots h_n(X)$ in the corresponding arrays will be occupied) is $2^{-n}$. The cost of reducing the probability of false positives by a factor of 2 is therefore approximately 1.5 bits per item.

The FPNE compact repository permits a quick determination of whether a target set of data is not present in the fingerprint repository. Through the use of Bloom filters, for example, a determination can be made with 100% accuracy that the target set of data does not exist in the protected data. When the Bloom filter returns a positive result, however, there is a chance of a false positive. The false positive rate (FP) is:

$$FP \cong \left(1 - e^{\frac{-kn}{m}}\right)^k$$

where:
m=the Bloom filter hash range (e.g., the number of bits in the Bloom filter array);
k=number of hash functions; and
n=number of elements (or entries) to the Bloom filter.

The number of hash functions (k) affects the false positive rate, but also can increase a density of the Bloom filter, which leads to either more Bloom filters and thus space usage or, at a certain figure, an increased rate of false positives. In addition, as the amount of data (n) represented in the Bloom filter increases, the chances of a false positive increase.

For a typical enterprise with confidential data to protect, the amount of data required to be fingerprinted can be very large. For example, typical database tables needing to be protected have risen from an order of 100,000 records to millions or tens of millions of records. In addition, with the rising use of cloud applications, DLP is desirable to protect data leakage in the cloud services. For such protection to be efficient, a database containing the representation of the protected data (e.g., fingerprint repository (FPR) or compact repository (FPNE)) should be stored close to a node performing the analysis, which in turn should be close to the client requesting the data analysis. Large network distances can cause long latency in the analysis.

Thus, large, cloud-involved networks have an inherent two-fold problem when using data fingerprinting for DLP. First, protecting documents using fingerprint recognition require synchronizing a large database (e.g., 10-1000 GB) that, for latency reasons, should be stored near nodes performing fingerprint analysis, which means relatively expensive storage. The issue is multiplied by the number of tenants, since, for security reasons, the fingerprint repository is a single tenant (e.g., a fingerprint repository represents valuable information that a customer will not want to mix with that of other customers). In cases where a tenant has high traffic volume needing many analysis units, a single fingerprint repository is not sufficient. In this case, a single tenant may be accessing multiple repositories. The use of cheap data object storage is not indicated because the repository needs to be constantly modified in order to provide up-to-date protection. On the other hand, local disk space for virtual cloud machines can be significantly more expensive.

A second issue is that protecting documents using FPNE suffers from increased false positive rates due to increased amounts of protected data in a large, distributed network. Further, the FPNE does not include any metadata on the source of hashes, therefore it is not possible to take into account the amount of protected data versus matched data for a specific source or to report the identification of the source without reference to the fingerprint repository. This introduces a further complication for cloud-based servers because an analysis unit requires not only an updated FPNE file and the analysis unit cannot initiate direct contact with an on-premises fingerprint repository server to identify matching files. Embodiments of the present invention resolve these issues.

As discussed above, the false positive rate for a Bloom filter-based FPNE repository increases as the number of entries (n) increases. More accurately, the ratio n/m most strongly affects the false positive rate. Increasing the number of entries (n) without increasing the number of bits in the Bloom filter array (m) increases FP. In some prior implementations using a Bloom filter, when n increases beyond a certain threshold, the Bloom filter is considered "full," and to address that, a new bloom filter block is introduced. Then, during analysis of a target data set, each bloom filter block is checked. The false positive rate (FP) will increase linearly with the number of bloom filter blocks:

$$FP \cong D \times \left(1 - e^{\frac{-kn}{m}}\right)^k$$

For environments having a large amount of secured data, D (the number of bloom filter blocks) can rise to a large number, which makes the practical false positive rate higher than practical for target file identification.

In order to address this high false positive rate, embodiments reduce the ratio n/m by increasing "m," the number of bits in the Bloom filter array. While this could be accomplished by increasing the memory space allocated to the compact repository, this would make it impractical to have multiple copies of the repository locate close to the files being analyzed. Large compact repositories would consume significant amount of storage space and would consume significant network resources to update the repositories.

Embodiments increase "m" by replacing the bitmap object typically used to represent a Bloom filter with a compacted or compressed bitmap that allows access without significant compute resources for decompression. In one embodiment, a chosen "m" was $2^{32}$, which was increased by a factor of 2678 over the original m=1,600,000. In a certain embodiment, a Roaring bitmap method was chosen to implement the compression. Using the Roaring bitmap method, the disk size of the compressed compact repository did not increase significantly. The Roaring bitmap is a hybrid data structure that combines uncompressed bitmaps with sorted arrays. Further, Roaring bitmaps allow for fast random access and permit computation of an intersection between two Roaring bitmaps without needing to access all the data.

Through the use of a very large "m," there is no necessity to open additional Bloom filter blocks. Therefore, "D" remains equal to 1. The factor "D" that influences the false positive rate in a close to linear rate thereby remains constant. Further, the ratio "n/m" that also strongly affects the false positive rate remains low until "n" reaches about 10% of "m." This is approximately 400,000,000, which is very high for practical usage. D is not limited to 1, but due to the large "n," "D" will remain at one for any practical amount of fingerprint data.

Therefore, the false positive rate no longer increases linearly with the amount of data. In addition, by having only one block for the Bloom filter, compute resources are conserved due to there being a latency penalty to switch from block to block in the previous methods. This is illustrated by the following table comparing detection times and false positive rates for a traditional Bloom filter compact repository (FPNE) and compressed embodiments of the present invention (FPNE CMP) for several fingerprint data examples:

TABLE 1

| Fingerprinted data | Detected Data | FPNE Detection time [s] | FPNE-CMP Detection time[s] | FPNE False positive rate | FPNE-CMP False positive rate |
|---|---|---|---|---|---|
| 5M email addresses | 100K random words | 0.95 | 0.7 | 5.20% (26/500) | 0.0% (0/5000) |
| 15M email addresses | 100K random words | 1.65 | 0.7 | 9.20% (46/500) | 0.0% (0/5000) |
| 3M × 5 (Name, Address, email, SSN, ID) | 100K random words | 0.85 | 0.7 | 0.0% | 0.0% (0/5000) |

The results show that FPNE CMP detection times are consistent and lower than those for traditional FPNE methods. In addition, the false positive rate is effectively zero due to the increased size of the Bloom filter.

Figure 8:
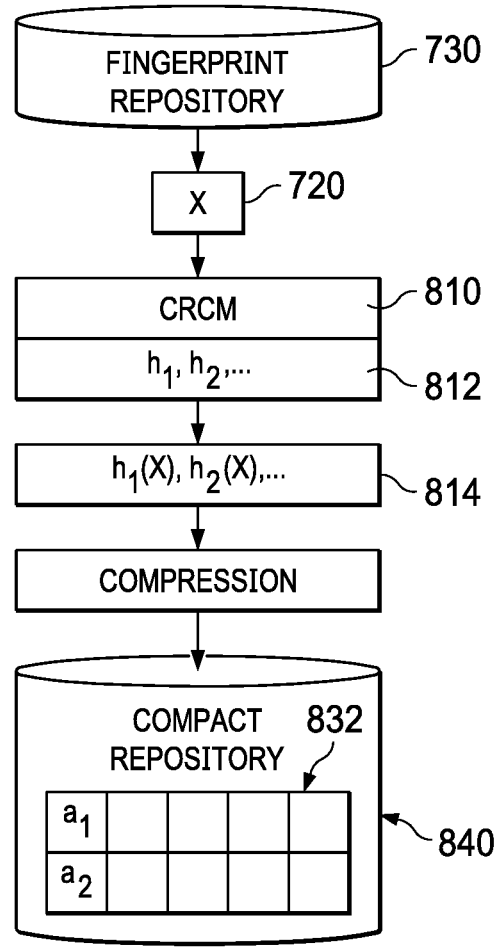
FIG. 8 is a simplified block diagram illustrating a data flow diagram showing the modules for generating an efficient, compact, and compressed probabilistic representation of fingerprinted content.

FIG. 8 is a simplified block diagram illustrating a data flow diagram showing the modules for generating an efficient, compact, and compressed probabilistic representation of fingerprinted content is shown. The steps illustrated in FIG. 8 are similar to those illustrated in FIG. 7. As with FIG. 7, compact representation creation module (CRCM) 810 accesses a hash X 720 from fingerprint repository 730. CRCM 810 employs one or more hash-functions $h_i$ 812 to transform each hash value to an L-bits long binary number, $h_i(X)$ 814. The distribution of the numbers $h_i(X)$ may be close to uniform over the range $1:2^L$ These hashes are compressed using a desired compression system (e.g., Roaring bitmap) to provide for array entries in the compact repository of a length of $2^{32}$. For each of hash-function $h_i$ 814, there is a corresponding array $a_i$ 832 of length $2^{32}$ stored in compact repository 840. As with compact repository 1004, the elements of the arrays are bits which are all initiated to a have a zero value. After evaluating $h_i(X)$, the element of the array $a_i$ at the address $h_i(X)$ is set to 1; that is, the element is "flagged", indicating the existence of the element X. Because the mapping of elements to addresses in the array is quasi-random, there is a possibility of "collisions" between two different items, i.e., that: $h_i(X1)=h_i(X2)$ while $X1 \neq X2$.

Because of the length of the array entries in the compact repository, a probability of collisions is significantly reduced, as discussed above.

As discussed above, the compact repository (FPNE) provides optimal DLP coverage when associated with those nodes that performing fingerprint analysis. For a system that incorporates cloud-based file policy enforcement, compact repositories should be stored in association with the cloud policy engines (CPEs). This results in a distributed set of FPNEs, some of which may not be within an enterprise network. Providing a compact and accurate FPNE is accomplished through the use of Roaring bitmaps, as shown above. But to ensure the FPNE continues to secure files as included in a central fingerprint repository, a distribution mechanism is needed.

Figure 9:
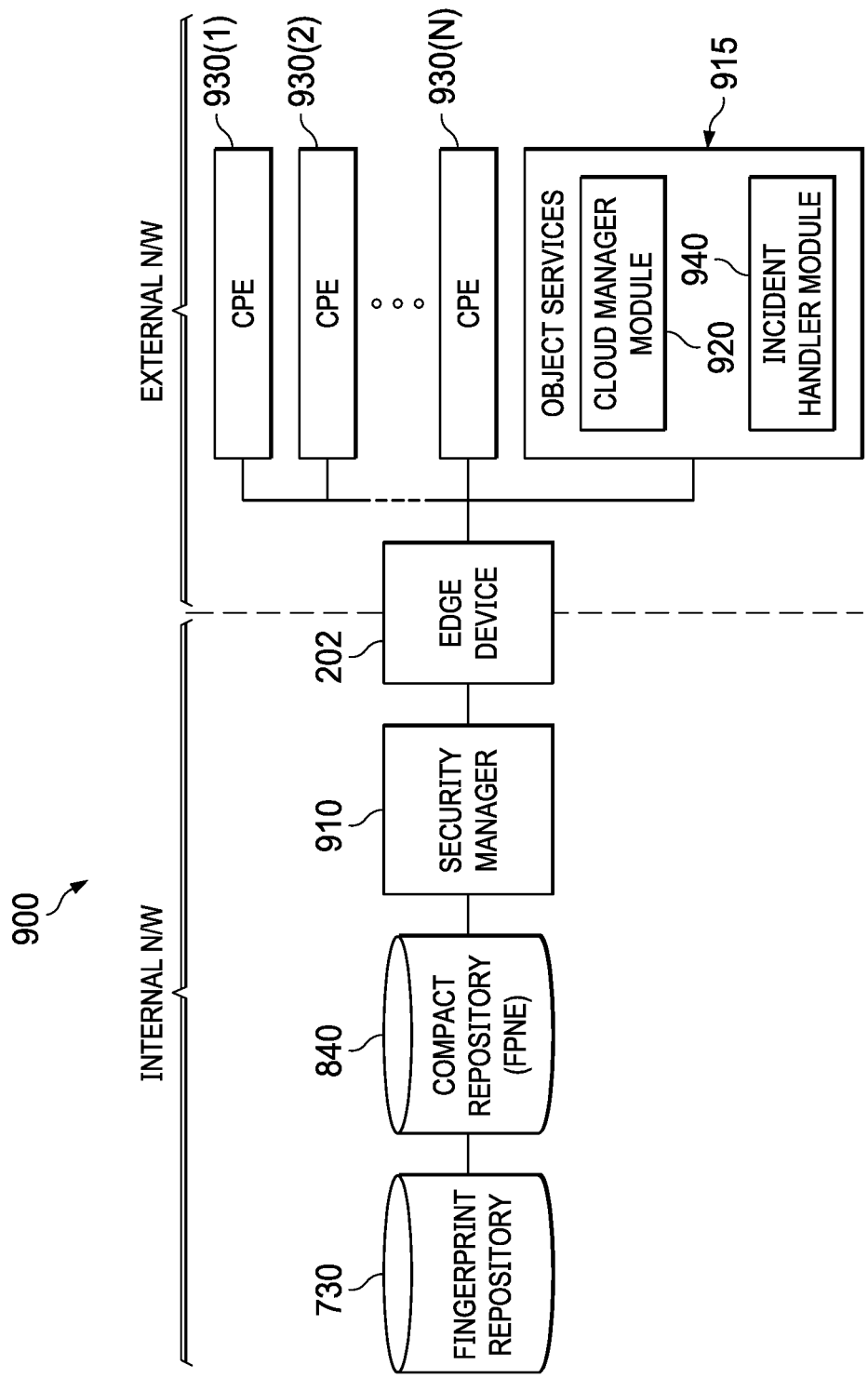
FIG. 9 is a simplified block diagram illustrating an example of a set of information handling system nodes involved in distribution of FPNEs for cloud-based policy enforcement, in accord with an embodiment of the present invention.

FIG. 9 is a simplified block diagram illustrating an example of a set of information handling system nodes involved in distribution of FPNEs for cloud-based policy enforcement, in accord with an embodiment of the present invention. A security manager information handling system 910 is coupled either directly or via a network to compact repository (FPNE) 840. As discussed above, the FPNE is coupled to a fingerprint repository 730 and entries in the compact repository are generated from information stored in the fingerprint repository. Security manager information handling system 910 is used to manage web, email, and other data sources. The security manager information handling system can customize policies, generate reports, monitor systems, and manage configuration and settings. As will be discussed more fully below, security manager information handling system 910 further manages when to provide updates of the FPNE to a cloud manager module 920 executing, for example, as a capability on an edge device 202. Edge device 202 is coupled to the security manager information handling system directly or via a network internal to the organization implementing a DLP incorporating the fingerprint analysis system. Edge device 202 passes information between systems internal to an enterprise network and external to the enterprise network, as discussed above. As will be discussed more fully below, cloud manager module 920, located on an object services information handling system 915, functions as a distributer of the FPNE to cloud policy engines 930(1)-(N), which will implement the policies associated with the entries of the FPNE, and are located external to the organization network.

Figure 10:
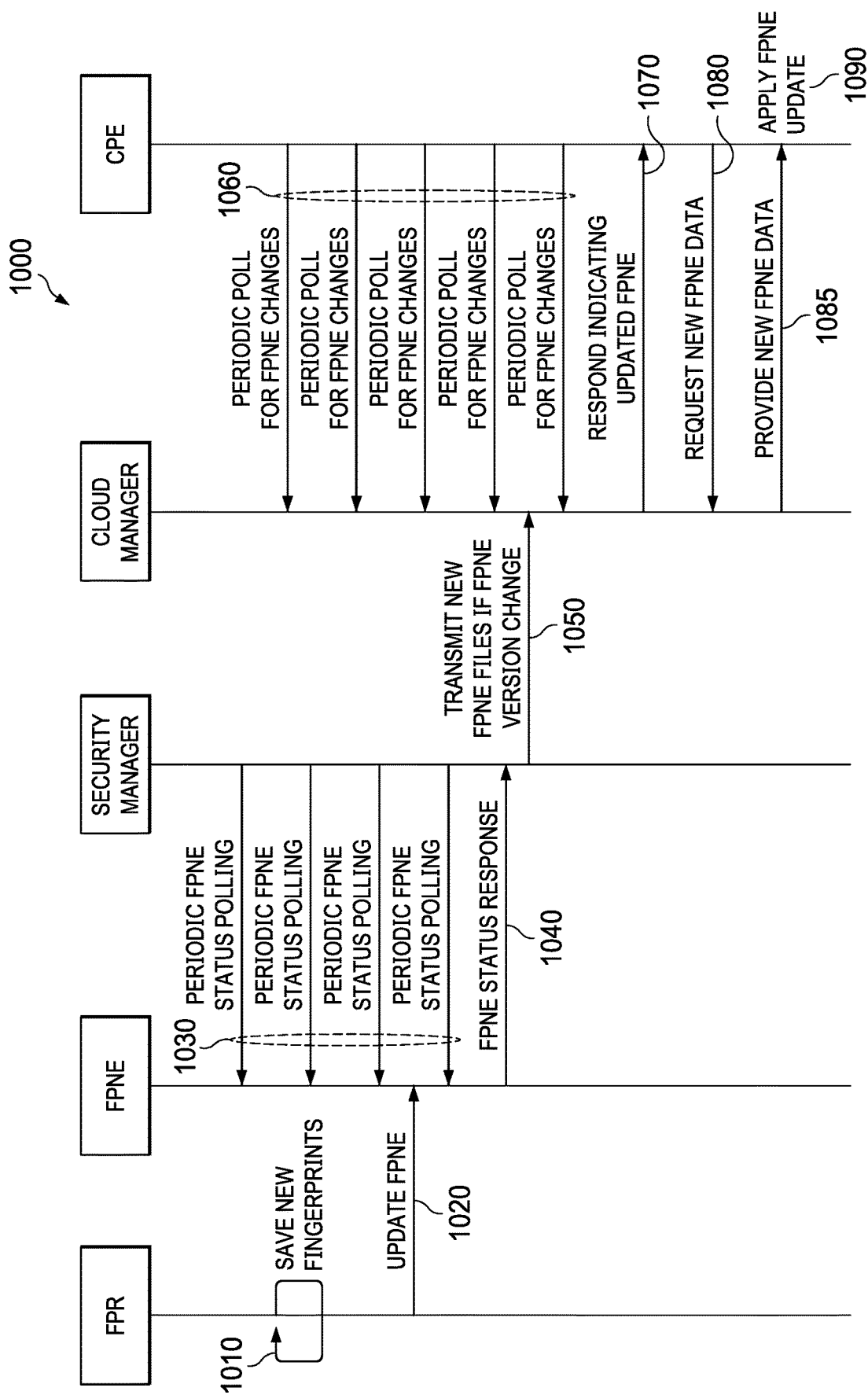
FIG. 10 is a flow diagram illustrating an example of an FPNE update flow from a fingerprint repository to the CPEs, in accord with an embodiment of the present invention.

FIG. 10 is a flow diagram illustrating an example of an FPNE update flow from a fingerprint repository to the CPEs, in accord with an embodiment of the present invention. As previously discussed, cloud service DLP should be scalable and offer reliable service regardless of access load. The analysis units (e.g., CPEs 930(1)-(N)) should therefore be spawned in response to a high load. In order to provide efficient fingerprinting service with regard to analysis time, the FPNE files must reside locally with the CPE on the same filesystem or in the same memory. As more data is fingerprinted or the fingerprint database otherwise changes over time, FPNE files should also be updated. These updates to the FPNE will then need to be efficiently distributed to the CPEs.

As additional data is desired to be secured, new fingerprints are saved to the fingerprint repository (1010). When new fingerprints are added to the fingerprint repository, the FPNE (compact repository) is updated as previously detailed (1020). Meanwhile, the security manager (e.g., security manager information handling system 910) can periodically poll the FPNE to determine whether an update to the FPNE has occurred (1030). It should be understood that embodiments are not limited to a polling model, but alternate mechanisms for informing the security manager of an update to the FPNE can be used (e.g., a publisher-subscriber model providing a notification). After an update has occurred to the FPNE, then a status response is transmitted to the security manager from the FPNE (1040). The status response can include the updated version of the FPNE or a portion of the FPNE that can be added to a version of the FPNE at the security manager.

Once the security manager has the updated FPNE, the new FPNE files are transmitted to a cloud manager (e.g., cloud manager module 920 executing on an object services information handling system 915) (1050). The cloud manager module stores the current version of the FPNE on a local memory for the cloud policy engines to upload. The CPEs periodically poll the cloud manager for an indication of an updated FPNE (1060). Such polling can be at any periodicity and in some embodiments is once every three minutes. Cloud manager module 920 can respond that there has been an update (1070). When there has been an update, the CPE requests the new FPNE or a new portion of the FPNE from the cloud manager for incorporation to an FPNE database on the CPEs (1080). When the CPE receives the FPNE update (1085), the FPNE update is applied at the CPE for use in DLP review of data transfers from the CPE (1090).

The system illustrated in FIG. 10 allows the security manager to update a centralized location (e.g., cloud manager 920) with updated configuration files that include update FPNE files. Newly spawned CPEs can take the updated FPNE file upon initialization. In addition, existing CPEs can periodically check the centralized location for updates to their FPNE databases.

An issue with a cloud-based DLP system utilizing distributed FPNEs, as illustrated in FIG. 10, is whether the CPE can supply a true or false answer to whether a data set matches a set of secured data in the fingerprint repository. For effective DLP, the fingerprint classifier that matches secured data should report not only that there were violation triggers but also identify the matching secured data. The Bloom filter-based FPNE solution discussed above does not contain information on the source, but instead only provides proof of non-existence, or a good chance of existence. But this binary "yes/no" is not sufficient to permit a DLP system or administrator to investigate the event. Reference must be made to the fingerprint repository itself to determine the identification of the secured data.

The large amount of data residing the fingerprint repository is one motivation for the use of the FPNE compact repository. Distributing this amount of data is impractical for both network and memory resource consumption. A data policy engine within an enterprise network can perform a FPNE check and then readily access the fingerprint repository using the internal network to determine the identification of the data. But a cloud-based policy engine (CPE) located in a network outside of an enterprise network does not have ready access to a fingerprint repository within the enterprise network, and therefore cannot identify the source of unstructured data.

Figure 11:
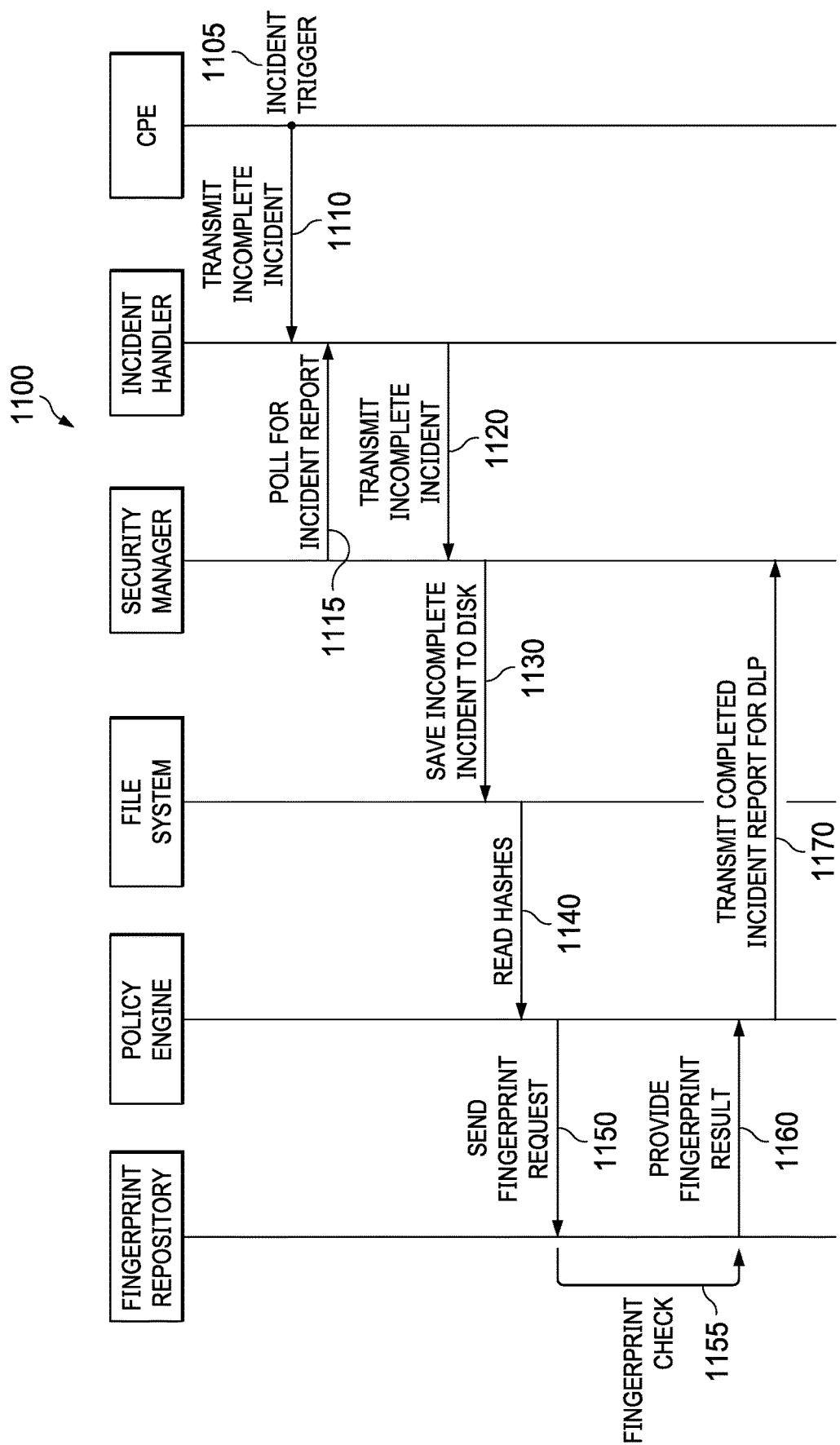
FIG. 11 is a simplified flow diagram illustrating a mechanism by which a CPE in an external network can provide information sufficient to identify the source of unstructured data triggering a FPNE incident in accord with an embodiment of the present invention.

FIG. 11 is a simplified flow diagram illustrating a mechanism by which a CPE in an external network can provide information sufficient to identify the source of unstructured data triggering a FPNE incident in accord with an embodiment of the present invention. The process begins with an incident trigger being detected at a CPE (e.g., CPE 930(1)) (1105). As discussed above, such a trigger can be a prohibited access of secured data identified in a FPNE database on the CPE. Each FPNE database can have a set of rules associated with the database that define the immediate actions the CPE takes to preserve security of the data (e.g., prevent the transfer or other access of the data by the entity attempting access). Since the FPNE does not contain sufficient information to identify the secured data itself, beyond the compressed hashes, the CPE can then also transmit an incident report to an incident handler (e.g., incident handler module 940 at object services information handling system 915) (1110). The incident report would be incomplete because there is no identifier of the secured data being accessed. Instead, the CPE can provide, in conjunction with the incomplete incident report, the hashes of the accessed data that matched records in the FPNE. As will be discussed more fully below, these hashes of the matching data will be used to more fully identify the secured data.

The incident handler can then provide the incomplete incident report to a DLP manager node in the enterprise network, such as security manager information handling system 910 (1120). In certain embodiments, the incident handler provides the incomplete incident report to the security manager information handling system in response to a polling request from the security manager information handling system (e.g., polling request 1115). Due to the incident report being incomplete, there is insufficient information to inform a DLP administrator of the complete nature of the attempt to access secure data. In order to supplement the information in the incomplete incident report, the security manager node can save the incomplete incident report with hashes to a file system (1130). A policy engine (e.g., at the security manager) can read the incomplete incident report including the hashes (1140) and use the hashes to send a fingerprint check request to a fingerprint repository (e.g., fingerprint repository 730) (1150). The fingerprint repository can check the hashes against the entries in the repository to determine the matching entries, which include identification of the data sources associated with each entry (1155). The result of the hash check, including the identification of the data source, is provided to the policy engine (1160). While an incomplete incident report can contain several identified sets of hashes, a final hash check response from the fingerprint repository can return multiple matching entries and data sources per single incomplete incident match. The policy engine can then complete the incident report with the data source identification information and will transmit the complete incident report to the security manager (1170). The completed incident report can be used by DLP administration for reporting and a more thorough response to the attempt to access secure information.

Embodiments of the present invention provide a mechanism for making an FPNE more accurate to handle large datasets typical of distributed enterprise networks including cloud-based services, distributing the FPNE to any number of cloud policy engines performing analysis to enforce data loss prevention rules, and for identifying an unstructured dataset associated with an attempt to access secure data at a CPE.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the software described herein may be received elements of system 100, for example, from computer readable media such as memory 112 or other media on other computer systems. Such computer readable media may be permanently, removably or remotely coupled to an information processing system such as system 100. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. An information handling system, configured as a cloud policy engine, and comprising:
   a processor;
   a network interface, coupled to the processor, and communicatively coupled to a first network;
   a first memory storing a compact repository storing a set of compact fingerprints, wherein
      each of the set of compact fingerprints is associated with one or more hashes of electronic data to which a transmission policy is applied,
      the one or more hashes of electronic data are filtered using a Bloom filter comprising an entry length of $2^{32}$ bits, and
      the filtered hash values are compressed; and
   a second memory storing instructions executable by the processor and configured to
      compare a set of data accessed by an entity at the information handling system with an entry of the compact repository to determine whether the set of data has an existing match in a fingerprint repository comprising the one or more hashes of the electronic data, and
      apply the transmission policy to the access of the set of data if the set of data has an existing match.

2. The information handling system of claim 1 wherein the instructions executable by the processor are further configured to, if the set of data has an existing match:
   transmit an incident report, using the network interface, to a data loss prevention server located in a second network, wherein the second network comprises a node storing the fingerprint repository.

3. The information handling system of claim 2 wherein the incident report comprises one or more hashes of the set of data for comparison against records in the fingerprint repository when the set of data comprises unstructured data.

4. The information handling system of claim 1 wherein the instructions executable by the processor are further configured to:
   transmit, using the network interface, a poll message requesting a status of an update to the compact repository, wherein the poll message is transmitted to a cloud management node.

5. The information handling system of claim 4, wherein if an update is present, the instructions executable by the processor are further configured to:
   receive the updated compact repository; and
   store the updated compact repository in the first memory.

6. The information handling system of claim 4, wherein the cloud management node comprises an edge device communicatively coupled to the first network and a second network.

7. The information handling system of claim 6, wherein the second network comprises a fingerprint repository node storing the fingerprint repository.

8. The information handling system of claim 1, wherein
   the first memory stores a set of compact repositories,
   the compact repository is one of the set of compact repositories, and
   each member of the set of compact repositories has an associated transmission policy.

9. A method for securing secured data in a data loss prevention system, the method comprising:
   performing a hash of the secured data, wherein the secured data has an associated access policy;
   storing the hash of the secured data in a fingerprint repository, wherein the stored hash of secured data is a fingerprint of the secured data;
   generating a compact representation of the fingerprint of the secured data using a Bloom filter;
   compressing the compact representation; and
   storing the compressed compact representation as an entry in a compact repository.

10. The method of claim 9 wherein said compressing the compact representation comprises:
    using a Roaring bitmap on the compact representation.

11. The method of claim 9 further comprising performing said compressing to improve a false positive rate of the compact representation by logically increasing a number of elements of the Bloom filter.

12. The method of claim 11 wherein the number of elements of the Bloom filter is logically set to $2^{32}$.

13. The method of claim 9 further comprising:
identifying data to be accessed;
performing a hash of the data to be accessed;
generating a compact representation of the hash of the data to be accessed using the Bloom filter;
compressing the compact representation of the hash of the data to be accessed;
comparing the compressed version of the compact representation of the hash of the data to be accessed against entries of the compact repository; and
allowing the access to the data to be accessed if there is no matching entry in the compact repository.

14. The method of claim 13 further comprising:
comparing the hash of the data to be accessed with entries stored in the fingerprint repository if there is a matching entry in the compact repository; and
identifying the secured data associated with a matching entry of the fingerprint repository.

15. A data loss prevention (DLP) network environment comprising:
a first information handling system configured to store a fingerprint repository, wherein
the fingerprint repository comprises one or more entries, and
each of the one or more entries comprises a hash of data associated with an access policy and an identifier of the data associated with the access policy;
a second information handling system configured to store a compact repository, wherein
the compact repository comprises one or more compact representations of the entries stored in the fingerprint repository,
the one or more compact representations are generated using a Bloom filter on the entries of the fingerprint repository and compressing the Bloom filtered data, and
the Bloom filter provides an entry of length $2^{32}$,
compare information associated with data requested to be accessed stored at the second information handling system against the compact representations stored in the compact repository, and
allow access to the data requested to be accessed when there is no matching entry in the compact repository.

16. The DLP network environment of claim 15 wherein the second information handling system is further configured to:
perform a hash of the data requested to be accessed;
generate a compact representation of the hash of the data requested to be accessed using a Bloom filter; and
compress the compact representation of the hash of the data requested to be accessed to generate the information associated with the data requested to be accessed.

17. The DLP network environment of claim 16, wherein the second information handling system is further configured to:
transmit the hash of the data requested to be accessed to the first information handling system when there is a matching entry in the compact repository, and
apply the access policy to the access of the data to be accessed; and
the first information handling system is further configured to:
receive the hash of the data requested to be accessed,
compare the hash of the data requested to be accessed with the one or more entries of the fingerprint repository, and
identify the data associated with the access policy from a matching entry of the fingerprint repository.

18. The DLP network environment of claim 17, wherein the second information handling system is further configured to transmit an incident report to a third information handling system when there is a matching entry in the compact repository;
the incident report comprises an indication that the second information handling system restricted access to the data requested to be accessed under the access policy;
the first information handling system is further configured transmit an identity of the secured data associated with the matching entry of the fingerprint repository to the third information handling system; and
the third information handling system is configured to associate the identity of the secured data with the incident report, and
generate a report comprising information from the incident report and the identity of the secured data.

* * * * *